(12) United States Patent
Marsh et al.

(10) Patent No.: US 11,297,068 B2
(45) Date of Patent: Apr. 5, 2022

(54) ANCHORING CLIENT DEVICES FOR NETWORK SERVICE ACCESS CONTROL

(71) Applicant: AT&T Intellectual Property I, L.P., Atlanta, GA (US)

(72) Inventors: Richard E. Marsh, Los Angeles, CA (US); Abtine Najand, Los Angeles, CA (US); Wesley Nguyen, Los Angeles, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 343 days.

(21) Appl. No.: 16/224,350

(22) Filed: Dec. 18, 2018

(65) Prior Publication Data
US 2020/0195656 A1 Jun. 18, 2020

(51) Int. Cl.
*H04L 29/06* (2006.01)

(52) U.S. Cl.
CPC .......... *H04L 63/107* (2013.01); *H04L 63/108* (2013.01)

(58) Field of Classification Search
CPC ....... H04L 9/00; H04L 63/107; H04L 63/108; H04W 12/00; H04W 12/61; H04W 12/63; H04W 12/08; G06F 21/00
See application file for complete search history.

(56) References Cited

U.S. PATENT DOCUMENTS

| | | |
|---|---|---|
| 8,073,444 B2 | 12/2011 | Riley |
| 8,116,748 B2 | 2/2012 | Aaron |
| 8,862,129 B2 | 10/2014 | Moshir et al. |
| 9,712,960 B2 | 7/2017 | Kumar et al. |

(Continued)

FOREIGN PATENT DOCUMENTS

| | | |
|---|---|---|
| WO | WO 2005/009067 | 1/2005 |
| WO | WO 2011/032479 | 3/2011 |

(Continued)

OTHER PUBLICATIONS

Diaz et al., "Context Awareness in Network Selection for Dynamic Environments," 2006 IFIP International Conference on Personal Wireless Communications, Sep. 20-22, 2006, pp. 216-227.

*Primary Examiner* — Joseph P Hirl
*Assistant Examiner* — Leynna Truvan
(74) *Attorney, Agent, or Firm* — Hartman & Citrin LLC

(57) ABSTRACT

Concepts and technologies of network service control for anchoring client devices for network service access control are provided herein. In one aspect of the concepts and technologies disclosed herein, a system is provided and can include a processor and a memory storing computer-executable instructions that, upon execution of the processor, configure the processor to perform operations. The operations can include receiving an anchor instantiation command to anchor one or more client devices to an authorized service location. The anchor instantiation command can initiate an anchor instantiation time period. The operations can include determining, during the anchor instantiation time period, a plurality of anchor attributes associated with the one or more client devices at the authorized location. The operations can include creating an anchor location token that represents the authorized service location based on the plurality of anchor attributes that were determined during the anchor instantiation time period.

20 Claims, 7 Drawing Sheets

(56) References Cited

U.S. PATENT DOCUMENTS

| | | |
|---|---|---|
| 9,973,891 B2 | 5/2018 | Patel et al. |
| 9,986,375 B2 | 5/2018 | Scellato et al. |
| 10,025,800 B2 | 7/2018 | Jones |
| 2013/0225196 A1 | 8/2013 | James et al. |
| 2014/0245412 A1* | 8/2014 | Seidl ........................ H04L 63/08 726/7 |
| 2016/0095082 A1 | 3/2016 | Lee |
| 2017/0249793 A1* | 8/2017 | Drako ................ G07C 9/00309 |
| 2017/0353435 A1 | 12/2017 | Pritikin et al. |
| 2018/0121956 A1 | 5/2018 | DeLuca et al. |
| 2018/0270073 A1 | 9/2018 | Senarath et al. |

FOREIGN PATENT DOCUMENTS

| | | |
|---|---|---|
| WO | WO 2011/127659 | 10/2011 |
| WO | WO 2016/196496 | 12/2016 |
| WO | WO 2017/005502 | 1/2017 |
| WO | WO 2017/220132 | 12/2017 |
| WO | WO 2018/024750 | 2/2018 |
| WO | WO 2018/052239 | 3/2018 |

\* cited by examiner

ANCHORING CLIENT DEVICES FOR NETWORK SERVICE ACCESS CONTROL

BACKGROUND

In distributed computing systems, a communication service provider may handle messages from devices that can be implemented in a networking environment. However, certain network security policies and network service agreements may permit specific network services to be accessible via certain devices. For example, when a customer subscribes to a digital satellite service and/or an over-the-top network delivered service, the service provider may limit consumption of certain media content to authorized client devices. Conventionally, some client devices may be relatively large in size and therefore are not easily moved from one location to another. Yet with the rise of client devices being more mobile in nature, people may attempt to relocate the client devices to other geographical locations. Conventional authentication mechanisms to control network access to network services may rely on the Global Positioning System ("GPS"), and thus requires GPS radio communication components to be incorporated within a client device in order to control network service access. However, wireless radio reception via GPS may be intermittent and not continuous due to weather conditions or other environmental factors. Conventional techniques may cause increased power usage on the client device due to invocation of GPS or other wireless communication component hardware, and in turn can lead to increased processor usage. Moreover, some client devices are being manufactured without certain geolocation hardware communication components (e.g., without GPS radios, Wide Area Network hardware, etc.).

SUMMARY

The present disclosure is directed to anchoring client devices for network service access control. According to one aspect of the concepts and technologies disclosed herein, a system is disclosed. The system can include a processor and a memory. The memory can store computer-executable instructions that, when executed by the processor, cause the processor to perform operations. In some embodiments, the operations can include receiving an anchor instantiation command to anchor one or more client devices to an authorized service location, wherein the anchor instantiation command initiates an anchor instantiation time period. In some embodiments, the system can be a client device that is included as one of the one or more client devices. In some embodiments, the system and/or a client device can be configured as one or more of an over-the-top device, a set-top box, an internet-of-things device, or a network access point. The operations can include further determining, during the anchor instantiation time period, a plurality of anchor attributes associated with the one or more client devices at the authorized service location. The operations can further include creating an anchor location token that represents the authorized service location based on the plurality of anchor attributes that were determined during the anchor instantiation time period. In some embodiments, the anchor location token can be configured to prevent a network service data stream from being routed through the system in response to the system moving outside of the authorized service location.

In some embodiments, the operations can further include instantiating an instance of the anchor location token on at least one of the one or more client devices at the authorized service location, and providing the anchor location token to a headend system. In some embodiments, the plurality of anchor attributes can include a network interface controller identifier, an instance of extended display identification data, and a serial number corresponding to user equipment that is communicatively coupled to the one or more client devices. In some embodiments, the operations can include assembling a communication environment attribute set based on the plurality of anchor attributes subsequent to the anchor instantiation time period. In some embodiments, the operations can further include detecting whether the system has moved outside of the authorized service location based on the anchor location token and the communication environment attribute set. In some embodiments, the operations can further include in response to detecting that the system has moved outside of the authorized service location, preventing a network service data stream from being routed through the system.

According to another aspect of the concepts and technologies disclosed herein, a method is disclosed. The method can include receiving, by a system communicatively coupled to one or more client devices, an anchor instantiation command to anchor the one or more client devices to an authorized service location, wherein the anchor instantiation command initiates an instantiation time period. In some embodiments, the system can be a client device that is included as one of the one or more client devices. In some embodiments, the system and/or a client device can be configured as one or more of an over-the-top device, a set-top box, an internet-of-things device, or a network access point. The method can further include determining, by the system during the anchor instantiation time period, a plurality of anchor attributes associated with the one or more client devices at the authorized service location. The method can include creating, by the system, an anchor location token that represents the authorized service location based on the plurality of anchor attributes that were determined during the anchor instantiation time period. In some embodiments, the anchor location token is configured to prevent a network service data stream from being routed through the system in response to the system moving outside of the authorized service location.

In some embodiments, the method can include instantiating, via the system, an instance of the anchor location token on at least one of the one or more client devices at the authorized service location, and providing, via the system, the anchor location token to a headend system. In some embodiments, the plurality of anchor attributes comprise a network interface controller identifier, an instance of extended display identification data, and a serial number corresponding to user equipment that is communicatively coupled to the one or more client devices. In some embodiments, the method can include assembling, by the system, a communication environment attribute set based on the plurality of anchor attributes subsequent to the anchor instantiation time period. In some embodiments, the method can include detecting, by the system, whether the system has moved outside of the authorized service location based on the anchor location token and the communication environment attribute set. In some embodiments, the method can include in response to detecting that the system has moved outside of the authorized service location, preventing, by the system, a network service data stream from being routed through the system.

According to yet another aspect, a computer storage medium is disclosed. The computer storage medium can have computer-executable instructions stored thereon. When the computer-executable instructions are executed by a processor, the processor can perform operations. In some embodiments, the processor can be included in a system that is communicatively coupled to one or more client devices. In some embodiments, the system can be a client device that is included as one of the one or more client devices. In some embodiments, the system and/or a client device can be configured as one or more of an over-the-top device, a set-top box, an internet-of-things device, or a network access point. In some embodiments, the operations can include receiving an anchor instantiation command to anchor one or more client devices to an authorized service location, where the anchor instantiation command initiates an instantiation time period. The operations can include determining, during the anchor instantiation time period, a plurality of anchor attributes associated with the one or more client devices at the authorized service location. The operations can include creating an anchor location token that represents the authorized service location based on the plurality of anchor attributes that were determined during the anchor instantiation time period. In some embodiments, the anchor location token is configured to prevent a network service data stream from being routed through the system in response to the system moving outside of the authorized service location.

In some embodiments, the operations can include instantiating an instance of the anchor location token on at least one of the one or more client devices at the authorized service location, and providing the anchor location token to a headend system. In some embodiments, the plurality of anchor attributes comprise a network interface controller identifier, an instance of extended display identification data, and a serial number corresponding to user equipment that is communicatively coupled to the one or more client devices. In some embodiments, the operations can further include assembling a communication environment attribute set based on the plurality of anchor attributes subsequent to the anchor instantiation time period. In some embodiments, the operations can include detecting whether the system has moved outside of the authorized service location based on the anchor location token and the communication environment attribute set. The operations can further include in response to detecting that the system has moved outside of the authorized service location, preventing a network service data stream from being routed through the system.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
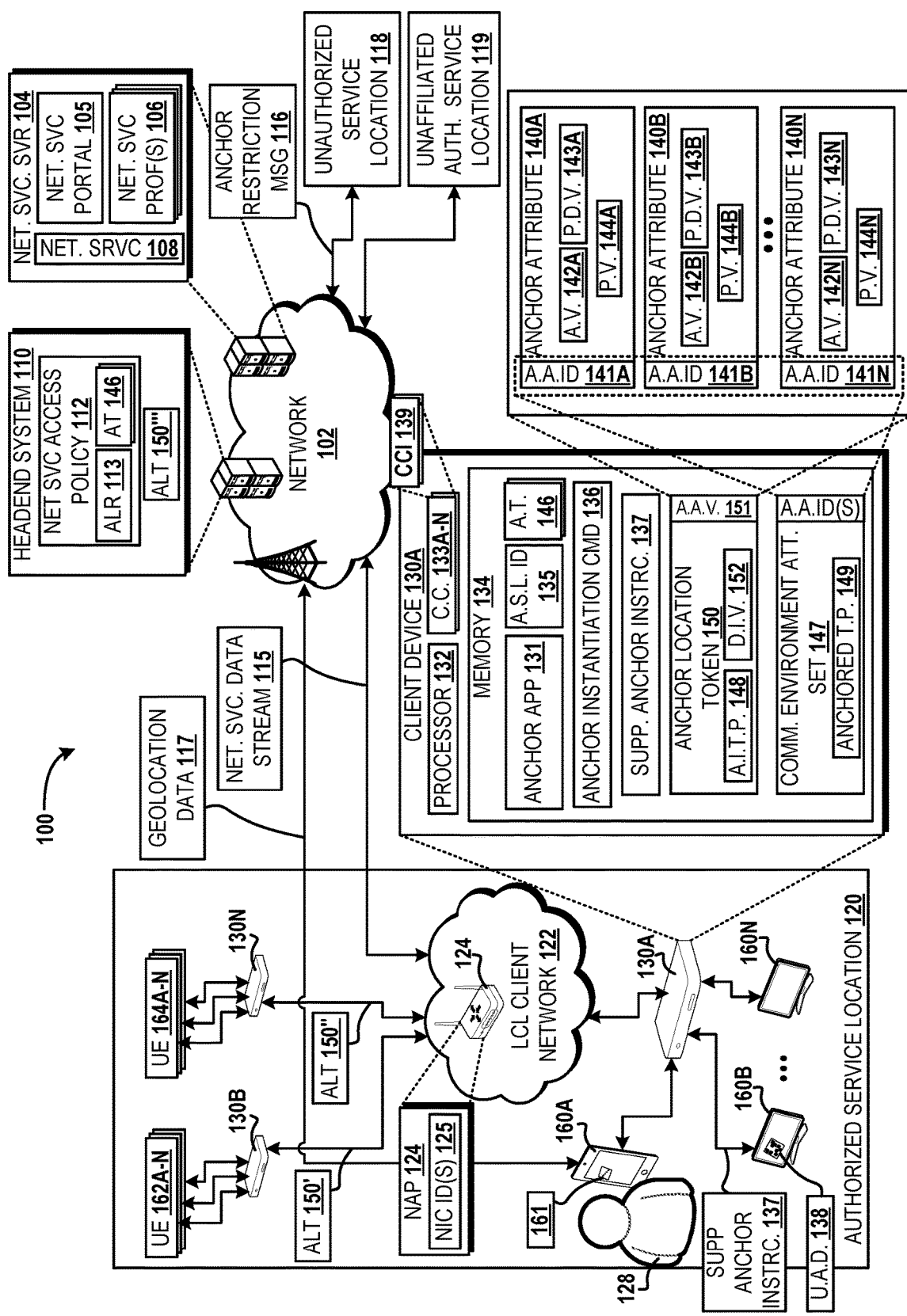
FIG. 1 illustrates aspects of an example operating environment pertaining to anchoring client devices for network service access control according to various embodiments of the concepts and technologies described herein.

The following detailed description is directed to network service access control through client device anchoring. In a distributed computing system, certain network security policies and access rules can depend on the geographic location of a client device. If the client device is moved outside of an authorized service location, the change in location should be detected so that network security policies and access rules can be reevaluated and enforced. Accurate geolocation of some devices may conventionally rely on geolocation hardware components included within that device, such as Global Positioning System ("GPS") radios. Although this geolocation hardware may typically be incorporated into some user equipment (e.g., mobile communication devices, tablets, laptop computers, etc.), there exist client devices operating in a local network which may not include such geolocation hardware. For example, client devices which lack geolocation hardware communication components (i.e., communication components which do not provide GPS reception and/or determination of geolocation through triangulation) may include one or more of Internet of Things ("IoT") devices, Internet-based television ("IPTV") devices, Over-the-Top ("OTT") devices, set-top-box ("STB") devices, or other machine-to-machine devices. In some embodiments, a client device may be configured as a network access point. As such, conventional mechanisms to determine geolocation which otherwise would have relied on GPS radio communication components and/or cellular radio tower triangulation are not available because of the lack of hardware components within the client devices. Moreover, attempts to rely on Wi-Fi mapping (e.g., through service set identifier mapping) and/or wide-area-network address mapping may have limited accuracy and rely on signal strength requirements which may inadvertently give false positives and/or false negatives.

Therefore, embodiments of the present disclosure provide network service access control by anchoring client devices without sole reliance on geolocation hardware communication components. Aspects of the present disclosure can improve the technical field of network access control. For example, aspects of the present disclosure can decrease network congestion through reduced device registration at cell towers and optimize hardware and/or software resources on the client device. In turn, processor core availability may be improved by reducing utilization and demand of the processor, which may speed up performance of the client device. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for network service access control will be described, according to an illustrative embodiment. The operating environment 100 shown in FIG. 1 includes a communications network ("network") 102 that is communicatively coupled with a local client network ("client network") 122 provided, at least in part, by a network access point 124. The network 102 can be associated with an Internet Service Provider ("ISP") and/or other communications service provider, which can provide a network service 108 to devices on the local client network 122. The network 102 can be supported by one or more compute resources, memory resources, and/or other resources. In some embodiments, the compute resources, the memory resources, and/or the other resources can collectively function to enable network traffic across the network 102 so as to support network services for one or more user equipment. The network 102 can provide edge devices which provide wired and/or wireless communicative coupling and can include one or more of a base station, a wireless router, a femtocell, an eNode B, a NodeB, a gNode B (i.e., an access point that incorporates new radio access technology, such as LTE-Advanced and other 5G technology) and/or other network nodes that can facilitate communication to and/or from the local client network 122. Additional details of aspects of an embodiment of the network 102 are illustrated and described below with reference to FIG. 7.

The operating environment 100 includes a network service server 104 and a headend system 110. The network service server 104 can include one or more physical server and/or virtual server that can be provided via a distributed computing system. In some embodiments, the network service server 104 may be operated by a communications service provider associated with the network 102, such as the portion which is operated by the communications service provider. In some embodiments, the network service server 104 can be configured as a content hosting platform that is operated by a third party. The network service server 104 can host and support a network service, such as the network service 108. For example, the network service server 104 may be associated with a content service provider such as but not limited to DIRECTV NOW by AT&T Incorporated, YOUTUBE Limited Liability Corporation that is a subsidiary of GOOGLE Incorporated, NETFLIX Incorporated, AMAZON VIDEO DIRECT that is a subsidiary of AMAZON DOT COM Incorporated, VIMEO Limited Liability Corporation, or any other audio and/or video content provider. The network service server 104 can provide one or more instances of network service data to the headend system 110, which in turn can be relayed and/or provided to a requesting device, such as a client device discussed below. Aspects of the network service server 104 can be configured as a computing system 600, which is discussed below with respect to FIG. 6.

In some embodiments, the network service server 104 can operate in conjunction with the headend system 110 to facilitate the access, retrieval, and/or delivery of one or more instances of network service data included in an instance of a network service data stream 115 associated with the network service 108. In some embodiments, one or more instances of the network service data stream 115 can include video content and/or audio content configured as executable data packets. The data packets from the network service data stream 115 can be configured for execution, presentation, and viewer consumption via a user equipment ("UE"), such as one or more of the UEs discussed below. In some embodiments, the network service 108 can be considered to include, but should not be limited to, a communication streaming service, an on-demand video content service, a video-sharing service, an over-the-top content service, a streaming audio service, a video-conferencing service, combinations thereof, or the like. In various embodiments, the network service server 104 may provide compute services, analysis services, storage services, routing services, switching services, relay services, virtualized services, non-virtualized services, combinations thereof, or the like. It should be understood that the term "service" should be construed as one or more executing applications or any other computer-executable instructions that can provide a set of communication and/or network functions and network service data for instances of the network service data stream 115 on behalf of one or more of the network service server 104, the headend system 110, and/or the network 102. Therefore, as mentioned herein, the term "service" is not intended to be used, and shall not be construed or interpreted, to be directed to, invoke, and/or pertain to any abstract idea, other judicial exceptions, or any non-patentable subject matter. The network service 108 can be used by a service provider, by third parties, and/or by customers via user equipment, servers, and/or other virtualized and/or non-virtualized computing systems.

In some embodiments, the network service 108 can be supported by a network service portal 105. The network service portal 105 can provide a back-end network interface and a front-end user interface, such as an application programming interface, a web-based interface, combinations thereof, or the like. The network service portal 105 can be accessed by one or more UEs and/or client devices discussed below to request delivery of one or more instances of the network service data stream 115. In some embodiments, the network service server 104 can include, and/or have access to, one or more instances of processing resources and/or memory resources that can provide storage of one or more instances of a network service profile(s) 106. In some embodiments, a user (e.g., a user 128) can be associated with one of the network service profiles 106 based on a subscription or use of the network service 108. The network service profile 106 may be accessed, created, and/or modified via the network service portal 105. Each user can configure a corresponding one of the network service profiles 106 to indicate preferences about content of the network service 108. The network service profiles 106 can also indicate a level or tier of service that may indicate how many UEs are permitted to present the network service data stream 115 and/or how many client devices, such as any of the client devices 130A-N discussed below, are authorized to receive, provide, and distribute the network service data stream 115 for the network service 108.

In some embodiments, instances of the network service profile 106 can enable the establishment of an authorized service location 120 such that each of the client devices 130A-N can independently self-determine whether they are authorized to provide, distribute, and present the network service data stream 115 for the network service 108 based on whether they (i.e., the particular client device doing the determination) are currently located within—and thus correspond with—the authorized service location 120 or are outside of the authorized service location 120 to which they are anchored. Because one or more of the client devices 130A-N may not include GPS or other geolocation communication components to use as sole confirmation of their geolocation with the authorized service location 120, the client devices 130A-N can implement other aspects of the present disclosure to anchor to the authorized service location 120, thereby retaining control of access to the network service 108. In various embodiments discussed herein, the authorized service location 120 is not defined and verified in terms of a mailing street address, geo-coordinates (e.g., latitude and longitude from GPS), Wi-Fi mapping (e.g., SSID detection), and/or a WAN address, but rather through the creation and use of an anchor location token 150, which is discussed in further detail below. The network service profile 106 can be configured to enable a client device, such as one or more of the client device 130A-N discussed below, to create and anchor itself and/or another client device to a particular environment so as to define the authorized service location 120 without the use of (i.e., activating and employing) geolocation hardware communication components (e.g., GPS radios, WAN radios, etc.). The client device may be anchored to an environment without the use of geolocation hardware communication components because they may not be provided or otherwise included in the particular system being anchored (e.g., any of the client devices 130A-N and/or the network access point 124 do not include geolocation hardware communication components). In an embodiment, a client device may have geolocation hardware communication components but they are unavailable, inaccessible, or otherwise do not provide sufficiently accurate geolocation results, thereby rendering any resulting geolocation information unusable for use in anchoring the client device. As such, any street address can be stored in a corresponding network service profile 106 for association with a user (e.g., the user 128), however the presence of a street address in the network service profile 106 is not used to verify whether a client device (e.g., any of the client devices 130A-N) is within the authorized service location 120. Further discussion of establishing and verifying the authorized service location 120 by one or more of the client devices 130A-N will be discussed below in further detail.

The operating environment 100 can also include one or more instances of the headend system 110 to facilitate and/or otherwise support the delivery, control, and authorization of access to the network service 108. In some embodiments, the headend system 110 can include a computing system that accepts signals having content data from a providing source (e.g., a satellite device or network server), and processes and transforms the signals into data packets and packages that can be distributed over the network 102. In some embodiments, the content data associated with the network service 108 may originate from a data storage source associated with the network service server 104, and in turn the headend system 110 can be implemented for distribution of and access control to one or more instances of the network service data stream 115 that can carry one or more content data packets of the network service 108. In some embodiments, the headend system 110 can include integrated receivers/decoders, receivers, encoders, transcoders, a traffic shaper, a channel modulator, processor resources, memory resources, and other resources capable to facilitate and/or provide access to one or more network services, such as the network service 108. In some embodiments, the headend system 110 can create and/or store one or more instances of a network service access policy 112. In some embodiments, the network service access policy 112 can be a normalized policy that is applicable to all network service profiles 106. In some embodiments, an instance of the network service access policy 112 can be created and customized specifically for one or more of the network service profiles 106. The network service access policy 112 can be referenced and analyzed to determine when access to an instance of the network service data stream 115 should be blocked based on violation of one or more instances of an anchor threshold 146, which will be discussed in further detail below. In some embodiments, the network service access policy 112 can include an anchor location restriction 113. The anchor location restriction 113 can be configured as a flag within the network service access policy 112 in order to indicate that the corresponding network service 108 (and/or a specific type of content or instance of the network service data stream 115) is conditionally authorized to be provided to a client device (e.g., any of the client devices 130A-N) anchored to the authorized service location 120, so long as that client device remains within the authorized service location 120 as defined by an anchor location token, such as the anchor location token 150, as discussed below. In some embodiments, the network service access policy 112 can allow a client device (e.g., any of the client devices 130A-N) to be released from its current authorized service location 120 and anchored to another location, such as an unaffiliated authorized service location 119, which will be discussed below in further detail.

In various embodiments, the operating environment 100 can include one or more instances of the network access point 124. The network access point 124 can provide the local client network 122 at a generally fixed location (e.g., by the network access point 124 being located in a house, workplace, retail establishment, etc.), which coincides with the authorized service location 120. The local client network 122 can be configured as a wireless radio access network. For example, the network access point 124 can operate in accordance with any IEEE 802.11 ("Wi-Fi") standard(s) to provide the local client network 122. In other embodiments, the network access point 124 can be a network edge router that includes a Wi-Fi access point. The network access point 124 can include one or more processors, memory, internal transceivers, antennas, modems, or the like, each of which can facilitate and/or otherwise provide connectivity to one or more wide area networks ("WANs"), such as the network 102, so as to facilitate communications with one or more other networks including the Internet (not shown), for example. In some embodiments, the network access point 124 can be connected to one or more external modems, switches, edge devices, or the like, of the network 102, thereby allowing for implementation of connectivity to the network 102 via one or more wireline (e.g., fiber optic, coaxial, and the like) and/or wireless communication paths, which are embodied in the connecting lines shown in FIG. 1. When communicatively coupled to the network 102 and one or more of the client devices 130A-N, the network access point 124 can be configured with a WAN address and a network interface controller identifier 125. The WAN address can be an Internet Protocol address that is assigned to the network access point 124, and in turn is externally visible to the network 102 from the network access point 124. The network interface controller identifier 125 can be a Media Access Control address that is not visible to the network 102, but instead is provided to one or more client devices 130A-N and internally visible within the local client network 122. Various data packets (e.g., included in the network service data stream 115) can be routed, relayed, and/or otherwise provided through the network access point 124. Although one instance of the network access point 124 is illustrated in FIG. 1, it is understood that multiple instances of the network access point 124 can be included in various embodiments. It is understood that the examples provided are for illustration purposes only, and therefore should not be construed as limiting in any way.

In various embodiments, the operating environment 100 can include one or more instances of the client devices 130A-N. The client devices 130A-N correspond with a computing system that does not include geolocation hardware communication components, such as GPS radio communication transceivers, WAN wireless radio transceivers, or the like. The client devices 130A-N can include communication components 133A-N (i.e., hardware transceivers with virtualized and/or non-virtualized communication interfaces) that provide communicative coupling (e.g., to the network access point 124, other client devices, and/or UEs) without having, using, activating, and/or relying on GPS radio transceivers and/or wireless radios to enable or provide geolocation data through triangulation (e.g., cell tower triangulation). In some embodiments, instances of the client devices 130A-N may be referred to as a "local machine-to-machine client device" due to the communication components 133A-N lacking geolocation hardware communication components as discussed above. Examples of an instance of the client devices 130A-N can include an IoT device, an IPTV device, an OTT device, an STB device, a smart home appliance, or a combination thereof. In some embodiments, the network access point 124 may be incorporated within an instance of one of the client devices 130A-N based on the network access point 124 having only wired communicative coupling with the network 102, although this may not necessarily be the case for all embodiments. It should be understood that the example embodiments provided are for illustration purposes only, and therefore should not be construed as limiting the possible embodiments based on the present disclosure.

Each of the client devices 130A-N may be configured substantially similar to each other, and therefore a description of client device 130A will be provided for purposes of clarity. The client device 130A can include hardware compute resources that provide a processor 132 that is particularly configured and transformed to perform operations discussed herein, such as by execution of computer-executable instructions that can be stored in a memory 134, such as by an anchor application 131. The processor 132 can include one or more central processing units ("CPUs") configured with one or more processing cores, one or more graphics processing unit ("GPU") configured to accelerate operations performed by one or more CPUs, one or more system-on-chip ("SoC") components, one or more application-specific integrated circuit components, combinations thereof, or the like.

Each of the client devices 130A-N, such as the client device 130A, can include the communication components 133A-N that are configured to provide communication interfaces so as to communicatively couple with one or more UE, such as one or more of UE 160A-N. Similarly, the client devices 130B-N can include one or more instances of the communication components 133A-N so as to enable communicative coupling with a UE, such as UEs 162A-N communicatively coupling with the client device 130B and UEs 164A-N communicatively coupling with the client device 130N. When a UE is communicatively coupled to a client device (e.g., any of the UEs 160A-N communicatively coupled to the client device 130A), each UE may use the same and/or separate virtual and/or non-virtual interface to provide the communicative coupling via wired and/or wireless communication, such as via one or more communication component interfaces 139. As used herein, the communication component interfaces 139 do not include (and thus lack or otherwise do not pertain to) geolocation hardware communication components (e.g., GPS radio transceivers, WAN transceivers, etc.).

For example, the communication components 133A-N can provide hardware and/or software that provides the communication component interfaces 139, which may include one or more instances of High-Definition Multimedia Interface, an optical audio interface, a DisplayPort interface, a Video Graphics Array interface, a digital video interface, a Wi-Fi interface that provides a wireless network interface control port, a Universal Serial Bus interface, a hard disk drive interface (e.g., parallel ATA, serial ATA, eATA interface), a proprietary interface and/or standardized data interface (e.g., a Mini DisplayPort interface, a Lightening interface, a Thunderbolt interface, a FireWire interface, etc.), or a combination thereof. As discussed below in further detail, information visible via the communication components 133A-N can be used to define the authorized service location 120 via an anchor location token 150. It should be understood that the examples are provided are for illustration purposes only, and therefore should not be construed as limiting in any way.

Instances of the client devices 130A-N can include an instance of the memory 134. The memory 134 can include one or more hardware data storage devices that are configured to provide and perform data storage operations, including temporary or permanent storage operations. In some embodiments, the memory 134 includes volatile and/or non-volatile memory implemented in any method or technology for storage of information such as computer-readable instructions, data structures, program modules, or other data disclosed herein. In the claims, the phrase "memory," "computer storage medium," and variations thereof does not include waves or signals per se and/or communication media. In some embodiments, the memory 134 can include an anchor application 131 having computer-executable instructions that cause the performance of operations discussed herein. In some embodiments, the anchor application 131 can be firmware operating on a client device (e.g., any of the client devices 130A-N). In some embodiments, the anchor application 131 may perform operations for anchoring one or more of the client devices 130A-N. The anchor application 131 may execute in the background of a client device (e.g., any of the client devices 130A-N) to monitor the geolocation of itself (and/or other communicatively coupled client devices) without the use of geolocation hardware communication components so as to determine when the client device (e.g., itself and/or other client devices) has moved outside of (or otherwise away from) the authorized service location 120, such as to an unauthorized service location 118 or an unaffiliated authorized service location 119.

In some embodiments, the unauthorized service location 118 corresponds to a location in which an instance of the network service data stream 115 is not permitted or otherwise authorized to be provided, streamed, distributed, or otherwise presented. For example, this could be because none of the network service profiles 106 have a subscription to the network service 108 corresponding to the unauthorized service location 118. Alternatively, certain media content may be temporarily locked and prevented from being shown to customers in a certain market. For example, in an embodiment where the network service 108 is associated with providing streaming media content via the network 102, an instance of the network service data stream 115 may provide streaming media content that has the anchor location restriction in effect, such as due to the streaming media content being a national sporting event that has geolocation restrictions as to where the media content is allowed to be presented to users (e.g., hometown restrictions to promote physical attendance by local residents). Therefore, in this example, if the client device 130A is distributing instances of the network service data stream 115 to the UEs 160A-N within the authorized service location 120, but the user 128 attempts to move the client device 130A outside of the authorized service location 120 to another location (e.g., the unauthorized service location 118 and/or the unaffiliated authorized service location 119) while the anchor location restriction 113 remains in effect (and/or while the client device 130A remains anchored to the authorized service location 120), then the anchor application 131 can detect that a change in geolocation away from the authorized service location 120 has occurred based at least on an anchor location token 150 discussed below, and in turn can prevent instances of the network service data stream 115 from being presented via the client device 130A to any UEs at the new location (e.g., the unauthorized service location 118 and/or the unaffiliated authorized service location 119). For clarity, a brief discussion of the unaffiliated authorized service location 119 and the unauthorized service location 118 is provided, followed by a discussion of the anchor application 131.

In some embodiments, the unaffiliated authorized service location 119 may include its own set of one or more unaffiliated client devices (not shown) that are anchored to the unaffiliated authorized service location 119 due to a subscription to the network service 108 by the same or another user. Therefore, the unaffiliated client devices would be configured to receive instances of the network service data stream 115 due to being anchored to the affiliated authorized service location 119. The unaffiliated authorized service location 119 may not be affiliated or otherwise associated with the authorized service location 120, and thus the client devices 130A-N would not be anchored or otherwise associated with the unaffiliated authorized service location 119. However, despite the unaffiliated authorized service location 119 being able to receive instances of the network service data stream 115 using its own client devices (i.e., the unaffiliated client devices), if any of the client devices 130A-N were to be moved away from the authorized service location 120 and attempt to connect to the network service 108 while at the unaffiliated authorized service location 119, then the anchor application 131 can detect the move in geolocation (without invocation of geolocation hardware communication components) and determine whether the particular client device remains anchored to the authorized service location 120. In some embodiments, a user may have legitimate motives for moving the client device (e.g., any of the client devices 130A-N) to the unaffiliated authorized service location 119 (e.g., the user recently expanding their business and moving equipment to the unaffiliated authorized service location 119, or recently subscribing to the network service 108 at multiple locations, or the particular client device is sold to another user who is at the unaffiliated authorized service location 119). In some embodiments, the anchor application 131 may provide a user with an opportunity to un-anchor the moved client device (e.g., any of the client devices 130A-N) from the authorized service location 120 and re-anchor to the unaffiliated authorized service location 119. In some embodiments, a user may access the network service portal 105 via their UE to initiate re-anchoring to the unaffiliated authorized service location 119. The network service portal 105 can authorize relocation of a client device so as to enable reconfiguration of an existing anchor location token, and/or creation of another anchor location token specific to the unaffiliated authorized service location 119. The process and operations pertaining to anchoring a client device (e.g., any of the client devices 130A-N) to the authorized service location 120 using the anchor location token 150 may be substantially similar to operations performed for re-anchoring a client device to the same or different location (e.g., the unaffiliated authorized service location 119). Therefore, for clarity purposes, a discussion of operations pertaining to anchoring is provided below.

In some embodiments, the user 128 may subscribe to the network service 108 at multiple locations, and therefore multiple instances of the authorized service location 120 may be provided in various embodiments. As such, in embodiments where multiple instances of the authorized service location 120 are provided, each instance of the authorized service location 120 can correspond with a separate instance of the anchor location token 150 that is configured to represent and define the particular instance of the authorized service location 120. Therefore, in some embodiments, any of the client devices 130A-N may store multiple anchor location tokens, where each anchor location token 150 corresponds with a specific authorized service location. For example, a business may have multiple campuses or buildings, and therefore the client devices 130A-N may be authorized to operate within any authorized service location associated with the business for which an anchor location token is provided. In some embodiments, a single anchor location token 150 can be configured to represent multiple authorized service locations 120 associated with the same network service profile 106, and therefore, in some embodiments, a single anchor location token 150 can enable any of the client devices 130A-N to operate in any corresponding authorized service location 120. In various embodiments, one or more instances of an anchor location token 150 can be configured to restrict the client devices 130A-N to operate only in the corresponding one or more authorized service locations 120 without reliance on geolocation hardware communication components. It is understood that the examples provided are for illustration purposes only, and therefore should not be construed as limiting in any way.

In various embodiments, the authorized service location 120 can be defined by an instance of the anchor location token 150 in terms of anchor attributes, such as the anchor attributes 140A-N. To anchor one or more of the client devices 130A-N to the authorized service location 120 without employing and/or activating geolocation hardware communication components on the client devices 130A-N (due to the client devices 130A-N not having geolocation hardware communication components), the anchor application 131 may detect and determine the plurality of anchor attributes 140A-N for use in creating the anchor location token 150. As such, the anchor location token 150 can represent and define the authorized service location 120 without reference to geolocation data 117 from a UE, which is discussed below with respect to a supplemental anchor instruction 137. In some embodiments, an instance of an anchor instantiation command 136 may be used to initiate creation and/or reconfiguration of the anchor location token 150. For example, the client device 130A may receive the anchor instantiation command 136 to anchor one or more client devices (e.g., any of the client devices 130A-N) to the authorized service location 120. In some embodiments, the anchor instantiation command 136 can be provided from a UE (e.g., the UE 160A), the network service server 104, and/or the headend system 110, in response to a client device (e.g., the client device 130A) being powered-on, or some other trigger action.

In some embodiments, the anchor instantiation command 136 can cause the anchor application 131 to generate and send a supplemental anchor instruction 137 to a communicatively coupled UE, such as the UE 160B. In an embodiment, the supplemental anchor instruction 137 may have been embedded within the anchor instantiation command 136. The supplemental anchor instruction 137 can instruct the UE 160B to present a unique anchor display 138 on a user interface. Examples of the unique anchor display 138 can include a two-dimensional barcode and/or a one-time use uniform resource locator. The anchor application 131 may prompt another (second) UE, such as the UE 160A, to optically and/or audibly scan or capture the unique anchor display 138. For example, the UE 160A may receive a separate notification from the anchor application 131 to capture the unique anchor display 138 being presented on the UE 160B. The unique anchor display 138 can configure the second UE (e.g., the UE 160A) to invoke and execute a native geolocation application 161 that executes on the UE 160A. In turn, the unique anchor display 138 instructs the native geolocation application 161 to use geolocation hardware communication components on the UE 160A to generate geolocation data 117 pertaining to the UE 160A, and provide the geolocation data 117 to the headend system 110.

In some embodiments, the headend system 110 may use the geolocation data 117 from the UE 160A to determine whether a location restriction is in effect for a particular instance of media content of the network service 108, such as for example, the anchor location restriction 113 for the network service access policy 112 that governs access to instances of the network service data stream 115. It is understood that the geolocation data 117 may not be used in the creation of an anchor location token, such as the anchor location token 150. In some embodiments, the geolocation data 117 provided by the UE 160A may be provided to the headend system 110 without being routed or relayed through a client device (e.g., the client devices 130A-N). In some embodiments, the geolocation data 117 may be stored in the network service access policy 112 and associated with the network service profile 106. However, a client device (e.g., the client devices 130A-N) may not have access to the geolocation data 117 and/or rely on the geolocation data 117 to create and/or reconfigure an instance of an anchor location token, such as the anchor location token 150. By the anchor location token 150 not relying on the geolocation data 117 and not relying on geolocation hardware communication components, malicious viruses and/or nefarious users may not be able to move an anchored client device away from the authorized service location 120 and spoof their location in an attempt to circumvent the anchor location restriction 113 with the intent of tricking the client device (e.g., any of the client devices 130A-N) into allowing instances of the network service data stream 115 to be presented. It is understood that the examples provided are for illustration purposes only, and therefore should not be construed as limiting in any way.

In various embodiments, the anchor instantiation command 136 can initiate an anchor instantiation time period 148 over which one or more of the anchor attributes 140A-N can be observed, analyzed, and assembled to serve as a basis for creating and/or re-configuring an instance of an anchor location token, such as the anchor location token 150. The anchor location token 150 can include a plurality of anchor attributes, such as any of the anchor attributes 140A-N, that are determined, assembled, and recorded during the anchor instantiation time period 148. In some embodiments, the anchor location token 150 can include and/or otherwise be associated with an authorized service location identifier 135, where the authorized service location identifier 135 can provide an identity for the anchor location token 150 so that the anchor application 131 can retrieve and/or activate the anchor location token 150 when the network service access policy 112 is in effect (e.g., when the anchor location restriction 113 is activated for the network service 108 and/or the network service data stream 115).

During the anchor instantiation time period 148, the anchor application 131 may observe one or more communication component interface(s) 139 of the communication components 133A-N and obtain information about devices associated with the authorized service location 120 to assemble one or more anchor attributes 140A-N that can be used to define and represent the authorized service location 120 through the creation of the anchor location token 150. The anchor instantiation time period 148 can operate as a time window in which the plurality of anchor attributes 140A-N can be identified and assembled by the anchor application 131 to create the anchor location token 150. For example, when a customer subscribes to the network service 108 and/or purchases a client device (e.g., any of the client devices 130A-N), the customer may initially communicatively couple (via wired cables and/or wireless connection) various UEs to the client device 130A using one or more instances of the communication component interfaces 139, such as the UE 160A wirelessly coupled to a wireless communication interface (e.g., an 802.11 channel) of the client device 130A and the UE 160B coupled to the client device 130A via an HDMI connection. At a later point in time that is still within the anchor instantiation time period 148, the user may communicatively couple subsequent UEs (e.g., the UE 160N which may be configured as a smart television or other IoT device) whose information can be incorporated as one of the anchor attributes 140A-N for storage within the anchor location token 150.

In various embodiments, an anchor attribute (e.g., each of the anchor attributes 140A-N) has an anchor attribute identifier (e.g., anchor attribute identifiers 141A-N), which provides information that can be observed by, and is visible to, the anchor application 131 on one or more of the client devices 130A-N. One or more of the client devices 130A-N and/or UEs are in communication with each other via the network access point 124 to relay and communicate the anchor attribute identifier to the anchor application 131 for assembly of the plurality of anchor attributes 140A-N. Each anchor attribute (e.g., of the anchor attributes 140A-N) can pertain to information about (or communication connection to) a UE, a client device, and/or a network access point that is (or should be) visible or observable via the communication components 133A-N associated with the authorized service location 120. As such, the anchor attribute identifiers 141A-N that represent the anchor attributes 140A-N can be observed and/or determined by the anchor application 131 via the communication components 133A-N (without reliance on geolocation hardware communication components, Set Service identifier information for Wi-Fi mapping, geolocation data 117, GPS information, and/or cellular tower triangulation). The information associated with each of the anchor attributes 140A-N may be obtained from and/or provided by a UE (e.g., any of the UEs 160A-N, 162A-N, and/or 164A-N), a client device (e.g., any of the client devices 130A-N), and/or the network access point 124.

Examples of information that can be captured by one of the anchor attribute identifiers 141A-N for a corresponding anchor attribute (e.g., any of the anchor attributes 140A-N) can include a network interface controller identifier (e.g., a Media Access Control address of a client device and/or a UE within the authorized service location 120), an instance of Extended Display Identification Data ("EDID"), a serial number or model number corresponding to a UE (e.g., any of the UEs 160A-N, 162A-N, and/or 164A-N) that is communicatively coupled to the one or more of the client devices 130A-N, an identifier of active communication component interfaces during the anchor instantiation time period 148 (e.g., which of the communication component interfaces 139 are observed to be active, connected, and/or in use by a client device), an IP address, a quantity for the number of communication component interfaces 139 that are active (e.g., two HDMI ports active, one optical audio interface connection in use, three local area network wireless channels in use, etc.), wireless channel identifiers for each of wireless local area network communication channels, or other unique string or identifier that can be used to define the authorized service location 120.

The memory 134 can store one or more instances of the anchor location token 150. The anchor application 131 can inspect, observe, and determine the anchor attributes 140A-N during the anchor instantiation time period 148 for storage of the anchor location token 150. In various embodiments, each of the anchor attributes 140A-N can be recorded within the anchor location token 150 as an instance of an anchor attribute vector 151. The anchor application 131 can create the one or more instances of the anchor attribute vector 151 within the anchor location token 150 to allow for inspection and analysis in determining whether a client device (e.g., any of the client devices 130A-N) has moved away from the authorized service location 120. Specifically, the anchor application 131 can record the same anchor attribute identifiers 141A-N within the anchor location token 150 and a communication environment attribute set 147. The anchor location token 150 can sense and dynamically determine changes in geolocation without reliance on geolocation hardware communication components. Specifically, the anchor application 131 can parse one or more instances of the anchor attribute vector 151 to determine changes between the anchor attribute identifiers 141A-N of the anchor location token 150 and the anchor attribute identifiers 141A-N as currently observed in the communication environment attribute set 147. During the anchor instantiation time period 148, the anchor attribute identifiers 141A-N would be observed as being the same in the communication environment attribute set 147 and the anchor location token 150. However, once the anchor instantiation time period 148 ends, then the anchor attribute identifiers 141A-N recorded during the anchor instantiation time period 148 will be fixed within the anchor location token 150 so as to establish a baseline by which deviations can be detected. The anchor application 131 may continuously and/or (a) periodically update the anchor attribute identifiers 141A-N within the communication environment attribute set 147 to reflect a "current" reading of each of the anchor attribute identifiers 141A-N after the anchor instantiation time period 148 ends. As such, the current readings of the anchor attribute identifiers 141A-N (indicated within the communication environment attribute set 147) can be compared against the recorded, baseline information of the anchor attribute identifiers 141A-N within the anchor location token 150. Therefore, the anchor location token 150 can provide a baseline by which to compare current readings of the anchor attribute identifiers 141A-N from the communication environment attribute set 147 to the anchor attribute identifiers 141A-N within the anchor location token 150 as they appeared during the anchor instantiation time period 148. Additionally, the anchor application 131 can detect if an anchor attribute is no longer observable within the communication environment attribute set 147, specifically by determining that a certain anchor attribute identifier is not observable or otherwise lacking an output that otherwise should be present and observable when a corresponding client device is located at the authorized service location 120. It is understood that the examples provided are for illustration purposes only, and therefore should not be construed as limiting in any way.

The anchor location token 150 can have a plurality of anchor attribute vectors 151, where each instance of an anchor attribute vector 151 can correspond with one of the anchor attributes 140A-N. The anchor attribute vector 151 can include an anchor attribute identifier corresponding to one of the anchor attributes (e.g., any of the anchor attribute identifiers 141A-N corresponding to the anchor attributes 140A-N, respectively), an anchor attribute value ("attribute value") (e.g., any of attribute values 142A-N), a penalty value (e.g., any of penalty values 144A-N), and a penalty decay value (e.g., any of penalty decay values 143A-N). The anchor application 131 can configure the anchor location token 150 to store one or more instances of the anchor attribute vector 151 in a multi-string vector format, such as: <anchor attribute identifier, anchor attribute value, penalty value, penalty decay value>. Each of the attribute values 142A-N can represent an assigned number and/or attribute name by which the anchor application 131 can determine which UE and/or client device provides the corresponding anchor attribute. For example, an attribute value may be in the format of "value-2a," "value-2b," "value-2c," where the number "2" corresponds with a particular client device and/or UE associated with the attribute (e.g., the UE 160B), and the "a," "b," "c" indicates a demarcation between attributes. Each of the penalty values 144A-N provides a numerical confidence value between a lower boundary (e.g., 0.0) and an upper boundary (e.g., 1.0) so as to indicate that if the corresponding anchor attribute is not detected or is different than expected (e.g., the corresponding anchor attribute identifier in the anchor location token 150 is not observed in the communication environment attribute set 147 or is observed but deviates from the anchor location token 150), then the penalty value (e.g., one of the penalty values 144A-N) will be extracted from the anchor attribute vector 151 and invoked so as to indicate the likelihood of the client device at issue (e.g., the client device 130A that has the anchor location token 150) no longer being in (i.e., moving away from) the authorized service location 120. Stated differently, a penalty value for an anchor attribute (e.g., any of the penalty decay values 143A-N for the anchor attributes 140A-N) indicates the probability that the detected change in the anchor attribute identifier is caused by and corresponds with the client device being moved out of the authorized service location 120. Discrepancies between the anchor location token 150 and the communication environment attribute set 147 can be forgiven based on the corresponding penalty decay value for the anchor attribute at issue (e.g., one of the penalty decay values 143A-N). Each of the penalty decay values 143A-N can provide a rate at which the penalty value will be diminished (or otherwise not considered) so that the anchor application 131 can "forgive" or ignore the anchor attribute change after the penalty value decays to the lower boundary (e.g., 0.0). The penalty decay value can be implemented to allow or permit a certain number of changes in the anchor attributes 140A-N in a given time period (e.g., an anchored time period 149), specifically based on which anchor attributes change and how many change over the anchored time period 149. For example, the client device 130A may be connected to the UE 160B and a newly purchased UE (e.g., UE 160N which may be a smart television) is connected to the client device 130A. The anchor application 131 can detect a change in the anchor attributes that are being observed, and may allow this change to occur, but disallow a second change to occur within a month (e.g., based on a penalty decay value requiring a month to diminish the effects of the penalty value from the first change).

The authorized service location 120 is represented by the anchor location token 150 storing the anchor attribute identifiers 141A-N (of corresponding anchor attributes 140A-N) within instances of an anchor attribute vector 151 during the anchor instantiation time period 148. By comparing the current anchor attribute identifiers 141A-N provided by the communication environment attribute set 147 with the corresponding anchor attribute identifiers 141A-N from the anchor location token 150, the anchor application 131 can determine whether there exists a discrepancy (or deviation) between the two so that the amount of discrepancies can indicate and correspond with the proximity of the client device 130A to the authorized service location 120. The anchor application 131 determines the likelihood that a client device (e.g., the client device 130A) has moved away from the authorized service location 120 based on analysis of the anchor location token 150 stored within the client device (e.g., the client device 130A). Each anchor attribute vector 151 has a penalty value (e.g., the penalty values 144A-N), which represents a defined probability that a change in the corresponding anchor attribute identifier (and thus the corresponding anchor attribute) implies or otherwise indicates that the client device 130A (which retains the anchor location token 150) has been moved away from the authorized service location 120. If the anchor attribute identifier is unique to the authorized service location, then the penalty value can be assigned a value close to the upper boundary limit (e.g., a penalty value of 1.0), thereby indicating a very high probability that the change in the corresponding anchor attribute identifier is caused by the client device 130A moving away from the authorized service location 120. For example, if the anchor application 131 detects that all of the IMEIs (which can be indicated as the anchor attribute identifiers 141A-N) of the UEs communicatively coupled the communications components 133A-N are not found in the anchor location token 150, then the corresponding penalty values 144A-N for anchor attributes that provide IMEIs can be extracted and used to take further action. If the anchor attribute identifier (e.g., any of the anchor attribute identifiers 141A-N) is not clearly unique, then the penalty value is assigned a lower number (between upper and lower limit), thereby indicating a lower probability that a change in the corresponding anchor attribute reflects a move in the client device 130A away from the authorized service location 120. Each anchor attribute vector 151 also has a penalty decay value (e.g., the penalty decay values 143A-N), which indicates the rate at which minor changes in the anchor attribute identifier (e.g., the corresponding anchor attribute identifiers 141A-N) are forgiven. In some embodiments, the penalty decay value can define a coefficient of linear decay and/or another function (e.g., a polynomial function and/or exponential function). The penalty values 144A-N can be adjusted during the anchor instantiation time period 148 so that a defined number (i.e., frequency) of discrepancies between the communication environment attribute set 147 and the anchor location token 150 would need to occur (after the anchor instantiation time period ends) and accumulate for the same or different anchor attribute before the anchor location token 150 indicates that a move away from the authorized service location 120 has occurred. When the anchor attribute identifier of any anchor attribute changes from the expected information (i.e., the anchor application 131 determines a deviation between the anchor location token 150 and the communication environment attribute set 147), its corresponding penalty value is extracted from the anchor attribute vector 151 and incorporated into a deviation indication vector 152. The anchor application 131 creates and compiles the deviation indication vector 152 based on accumulating the penalty values from each anchor attribute that correspond with anchor attributes that exhibit a deviation from the expected value (e.g., from any of the penalty values 144A-N). For example, if the anchor attribute identifiers 141A and 141B within the anchor location token 150 are not also present within the communication environment attribute set 147, then the anchor application 131 can extract the penalty values 144A and 144B corresponding with the anchor attribute identifiers 141A and 141B and incorporate them into the deviation indication vector 152. The deviation indication vector 152 can combine all of the individual penalty values 144A and 144B into an accumulated penalty value so that the deviation indication vector 152 can be compared to an anchor threshold 146. The anchor threshold 146 corresponds with the value at which the anchor application 131 can determine whether a client device (e.g., the client device 130A) has moved away from, or remains within, the authorized service location 120. The anchor location token 150 can present an indication of "moved" when the deviation indication vector 152 exceeds the anchor threshold 146, and can present "anchored" when the deviation indication vector 152 does not meet or exceed the anchor threshold 146. Multiple changes in each anchor attribute are cumulative, indicating that the client device 130A may be moving to a different environment, such as the unauthorized service location 118. As time passes, changes can also be forgiven according to the corresponding penalty decay value 143A-N. The deviation indication vector 152 can include and accumulate all of the penalty values (e.g., any of the penalty values 144A-N) that are extracted across all anchor attributes showing a deviation, and in turn the deviation indication vector 152 can record and provide a single accumulated penalty value. By this, the deviation indication vector 152 can represent the probability (i.e., likelihood) that all accumulated changes in the anchor attributes indicate or do not indicate a move away from the authorized service location. If the deviation indication vector 152 exceeds the anchor threshold 146, then the anchor application 131 determines that a move away from the authorized service location 120 has occurred. In response to determining that the client device 130A has moved away from the authorized service location 120, the anchor application 131 can block or otherwise prevent the network service data stream 115 from being distributed, presented, or otherwise provided through the client device 130A to one or more UEs that are communicatively coupled thereto. For example, if the client device 130A is moved from the authorized service location 120 to the unauthorized service location 118, the anchor application 131 can detect that the UEs 160A-N are no longer communicatively coupled to the communication components 133A-N, and therefore the corresponding anchor attributes (e.g., among the anchor attributes 140A-N) are not provided or otherwise updated in the communication environment attribute set 147. As such, the penalty values (e.g., corresponding to the anchor attributes 140A-N for the UEs 160A-N) would be extracted and accumulated to populate the deviation indication vector 152, which in turn may exceed the anchor threshold 146 so as to indicate that the client device 130A is no longer within the authorized service location 120.

In some embodiments, each of the client devices 130A-N associated with the authorized service location 120 performs its own analysis and determines whether it has moved outside of the authorized service location 120. In some embodiments, each of the client devices 130A-N can create its own anchor location token based on the anchor attributes that are observable to the client device during its anchor instantiation time period 148. In other embodiments, the client devices 130A-N can exchange information about anchor attributes with each other during the anchor instantiation time period 148 so that instances of the same anchor location token are provided to each of the client devices 130A-N within the authorized service location 120. For example, the anchor location token 150 stored in client device 130A may be duplicated and anchor location tokens 150' and 150" can be prepared for instantiation on the client devices 130B and 130N. In some embodiments, the headend system 110 may instantiate an anchor location token 150''' that is received from the client device 130A, where the anchor location token 150''' can be a duplicate of the anchor location token 150 stored on the client device 130A. The anchor application 131 can send and instantiate the anchor location tokens 150' and 150" on the client devices 130B and 130N, respectively. Therefore, each of the client devices 130A-N can operate independently so as to provide self-assessment as to whether it has moved outside of the authorized service location 120 without invocation of geolocation data 117 and/or geolocation hardware communication components.

When the anchor application 131 determines that the client device (e.g., the client device 130A) has moved away from the authorized service location 120, one or more operations may be performed. For example, the anchor application 131 may locally block the client device 130A from distributing or routing an instance of the network service data stream 115 via one or more communication component interfaces 139 of the communication components 133A-N. The anchor application 131 may send an anchor restriction message 116 to the headend system 110 to instruct the headend system 110 to block and/or prevent an instance of the network service data stream 115 from being provided to the client device 130A which was detected to have moved away from the authorized service location 120. In some embodiments, the other client devices which remain within the authorized service location 120 (e.g., the client devices 130B and 130N) may receive the anchor restriction message 116 so as to block the client devices 130B and 130N and the UEs 162A-N, 164A-N from receiving the network service data stream 115 until the client device 130A returns to the authorized service location 120. In some embodiments, the anchor restriction message 116 can prompt a user (e.g., the user 128) to access the network service portal 105 in order to reauthorize their client device 130A at the new location and/or initiate a request to grant an exception for temporary playback of the network service data stream 115, which may be granted by the headend system 110. In some embodiments, the anchor restriction message 116 can be provided to a network access point at another location (e.g., the unauthorized service location 118 and/or unaffiliated authorized service location 119) so as to block and/or prevent the client device which moved away from the authorized service location 120 (e.g., the client device 130A) from being able to provide, present, and/or distribute an instance of the network service data stream 115 at the other location. In some embodiments, the anchor application 131 may notify the network service server 104 and/or the headend system 110 that the client device 130A has moved away from the authorized service location 120 via the anchor restriction message 116. For client devices and/or UEs with only a few observable attributes that can be used as an anchor attribute, the penalty value and penalty decay value may be assigned manually and/or via default values from the network service access policy 112. For instances of the authorized service location 120 which provide multiple client devices and/or UEs that have many observable attributes that can be recorded as instances of an anchor attribute, the penalty values and penalty decay values can be set automatically based on a set of training scenarios. Each of the training scenario can specify hypothetical changes to anchor attributes, the time at which each one occurs, and the expected result.

The anchor application 131 executing locally on the client device 130A can lock or otherwise prohibit the client device 130A from distributing the network service data stream 115 to any UEs outside of the authorized service location 120 (e.g., at the unauthorized service location 118 and/or the unaffiliated authorized service location 119). In some embodiments, the anchor application 131 may send an instance of the anchor restriction message 116 to the headend system 110 and/or the network service server 104 with instructions to cease, prevent, and/or block distribution of the network service data stream 115 across the network 102. This may reduce network traffic and improve network performance by increasing network resource availability, specifically by preventing the routing of the network service data stream 115 to the client device 130A when the client device 130A is not at the authorized service location 120. In some embodiments, the headend system 110 may receive an instance of the anchor location token 150 that is stored and analyzed on the client device 130A, such as the anchor location token 150''' that can be stored in memory of the headend system 110. In some embodiments, the headend system 110 may request the communication environment attribute set 147 from the client device 130A that is suspected of not being located within the authorized service location 120. The headend system 110 and/or the network service server 104 may execute an instance of the anchor application 131 by a processor to confirm that the anchor location token 150''' does not match the communication environment attribute set 147, thereby verifying that the client device 130A has moved outside of the authorized service location 120.

The anchor instantiation time period 148 may be configured to last a designated number of minutes, hours, days, or other defined time frame. Once the anchor instantiation time period 148 ends, the anchor application 131 can encrypt the anchor attributes 140A-N stored within the anchor location token 150 (i.e., those anchor attributes 140A-N that were observed and determined during the anchor instantiation time period 148) such that a particular client device that stores the anchor location token 150 (e.g., any of the client devices 130A-N that receive an instance of the anchor location token 150, 150', 150") can be anchored to the authorized service location 120. As such, information and values provided by instances of the anchor location tokens 150, 150', 150", 150''' (e.g., the values and identifiers associated with the anchor attributes 140A-N which are discussed herein) cannot be tampered with when the anchor location token 150 is active and in use, nor can the instances of anchor attributes 140A-N stored within the anchor location token 150 be accessible to a UE (e.g., any of the UEs 160A-N, 162A-N, 164A-N) that attempts to read the anchor location token, thereby preventing the authorized service location 120 from being spoofed (i.e., preventing a UE from deliberately altering or falsifying one or more of the anchor attributes 140A-N stored in a communication environment attribute set 147 so as to match the anchor location token 150 even if the particular client device is moved outside of the authorized service location 120). In some embodiments, the anchor application 131 can authorize that the anchor location token 150 be reconfigured so as to adapt to changes in the authorized service location 120, such as additions of UEs to the authorized service location 120. The anchor application 131 can detect anchor attributes for the new UEs that are not nomadically visiting the authorized service location 120, but rather are fixtures of the authorized service location 120 through which the authorized service location 120 can further be defined. As such, anchor application 131 can reinstate the anchor instantiation time period 148 so that the new anchor attributes can be incorporated as new instances of anchor attribute vectors within the anchor location token 150. Once the anchor instantiation time period 148 ends, the anchor location token 150 can be locked and encrypted once again, and instantiated on other client devices (e.g., the client devices 130B-N) and the headend system 110 by overwriting the existing anchor location tokens 150', 150", and 150''', respectively.

The anchor application 131 can create and assemble an instance of the communication environment attribute set 147 during the anchor instantiation time period 148 or after the anchor instantiation time period 148 ends. The communication environment attribute set 147 provides the current status and output of the same anchor attributes 140A-N that are stored in the anchor location token 150 (i.e., by presenting an output of the current readings for the anchor attribute identifiers 141A-N), but provides the current status and information about the anchor attributes 140A-N as observed and detected after the anchor instantiation time period 148 ends, such as during an anchored time period 149. The anchored time period 149 refers to a time frame after the anchor location token 150 has been created and after the anchor attribute identifiers 141A-N are stored within the anchor location token 150 as a baseline by which to compare against the communication environment attribute set 147. The anchored time period 149 can be a cyclical time period that loops and restarts once it expires. The anchor application 131 can be triggered to update the anchor attribute identifiers 141A-N within the communication environment attribute set 147 during and/or after each occurrence in which the anchored time period 149 expires. In some embodiments, the anchor application 131 can update the communication environment attribute set 147 in near-real time, meaning updating the anchor attribute identifiers 141A-N as they are detected and determined without waiting until the anchored time period 149 expires. The communication environment attribute set 147 is used by the anchor application 131 to compare against the anchor location token 150, specifically by the anchor application 131 detecting whether the communication environment attribute set 147 is providing the same or different information relative to the anchor attributes 140A-N stored in the anchor location token 150. The anchor application 131 also can determine whether each of the anchor attribute identifiers 141A-N recorded in the anchor location token 150 are present within the communication environment attribute set 147.

Possession alone and storage of the anchor location token 150 on a client device (e.g., any of the client devices 130A-N) does not in and of itself permit or authorize a client device to provide instances of the network service data stream 115 to a UE (e.g., any of the UEs 160A-N, 162A-N, and/or 164A-N), but instead enables a client device (e.g., any of the client devices 130A-N) to detect when itself (or other client devices) have moved away from the authorized service location 120 without the use of geolocation hardware communication components. Therefore, possession of an anchor location token (e.g., any of the anchor location tokens 150, 150', 150", 150''') does not automatically grant the client device storing that token (e.g., any of the client devices 130A-N) access to the network service data stream 115. Instead, an instance of an anchor location token (e.g., any of the anchor location tokens 150, 150', 150", 150''') is configured to enable the system which possesses the anchor location token (e.g., any of the client devices 130A-N) to block and prevent distribution and routing of an instance of the network service data stream 115 without invoking, activating, or otherwise relying on geolocation hardware communication components and/or the geolocation data 117 (e.g., without reliance on GPS radio transceivers, geolocation coordinates, WiFi mapping through SSID and signal strength measurements, or the like), and therefore can verify that the client device remains within the authorized service location 120. It is understood that the examples provided are for illustration purposed only, and therefore should not be construed as limiting the scope of the concepts and technologies disclosed herein.

FIG. 1 illustrates one instance of the network 102, the network service server 104, the network service portal 105, the network service profiles 106, the network service 108, the headend system 110, the network service access policy 112, the anchor location restriction 113, the network service data stream 115, the anchor restriction message 116, the geolocation data 117, the unauthorized service location 118, the unaffiliated authorized service location 119, the authorized service location 120, the local client network 122, the network access point 124, the network interface controller identifier(s) 125, the user 128, the client devices 130A-N, the anchor application 131, the processor 132, the communication components 133A-N, the communication component interfaces 139, the memory 134, the authorized service location identifier 135, the anchor instantiation command 136, the supplemental anchor instruction 137, the anchor attributes 140A-N, the anchor attribute identifiers 141A-N, the attribute values 142A-N, the penalty decay values 143A-N, the penalty values 144A-N, the anchor threshold 146, the communication environment attribute set 147, the anchor instantiation time period 148, the anchored time period 149, the anchor location token 150, the anchor attribute vector 151, the anchor location token 150', the anchor location token 150", the anchor location token 150''', the UEs 160A-N, the UEs 162A-N, and the UEs 164A-N. It should be understood, however, that some implementations of the operating environment 100 can include zero, one, or more than one instances of these elements discussed above and shown in FIG. 1. As such, the illustrated embodiment of the operating environment 100 should be understood as being illustrative, and should not be construed as being limiting in any way.

Figure 2:
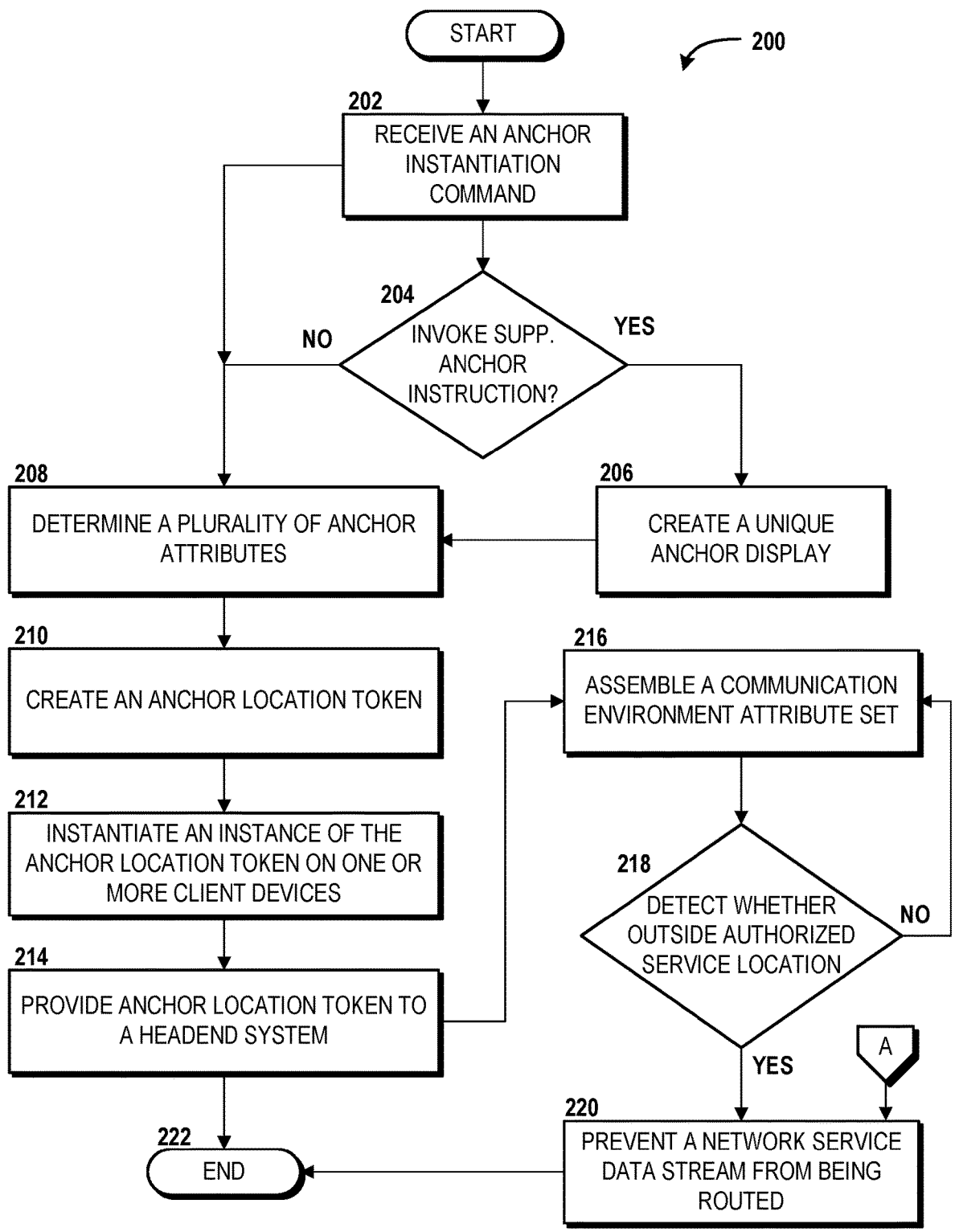
FIG. 2 is a flow diagram showing aspects of a method for anchoring client devices for network service access control, according to various embodiments of the concepts and technologies disclosed herein.
Figure 3:
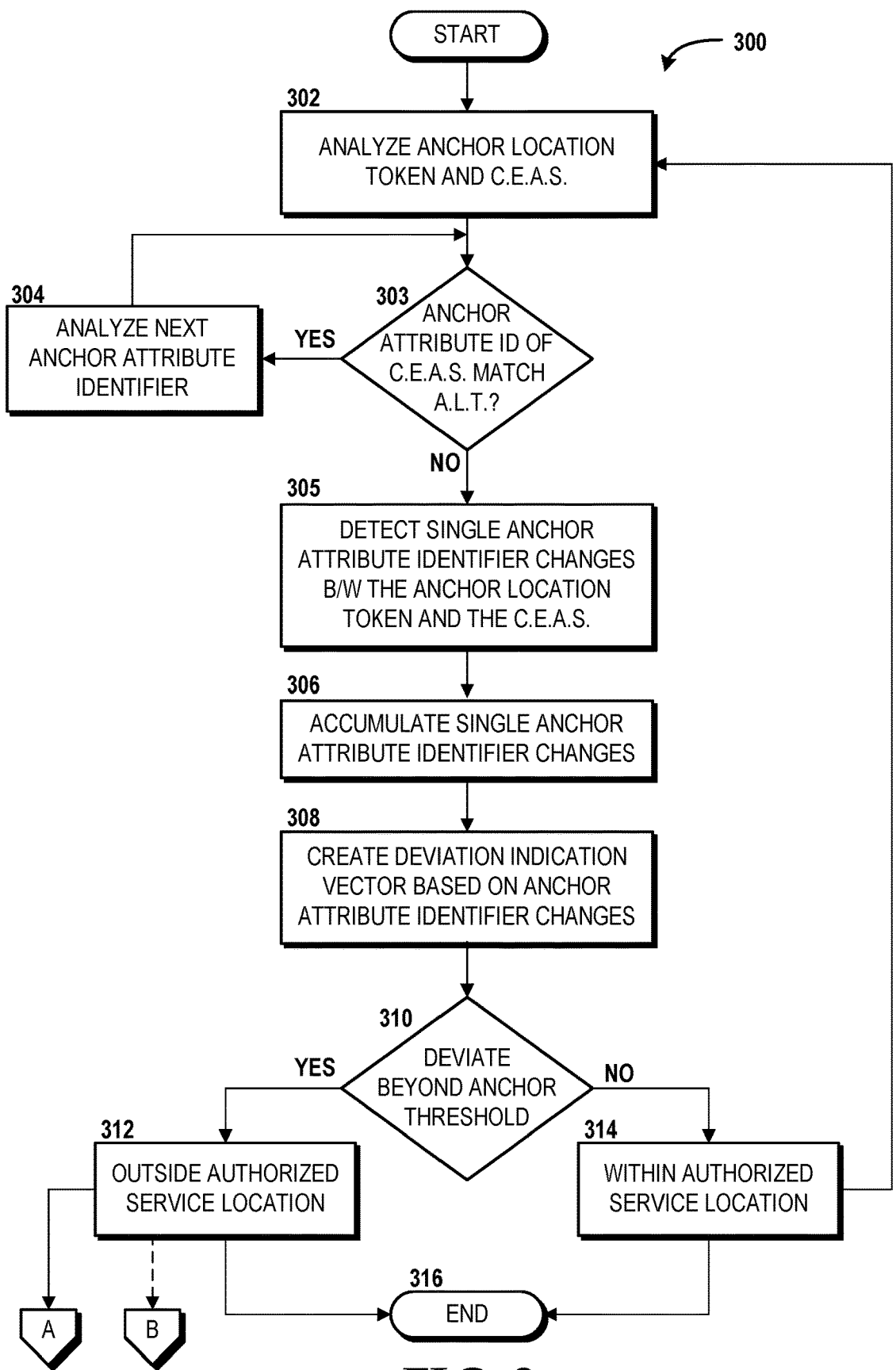
FIG. 3 is a flow diagram showing aspects of a method for detecting whether a client device remains within an authorized service location without geolocation hardware communication components, according to an illustrative embodiment of the concepts and technologies described herein.
Figure 4:
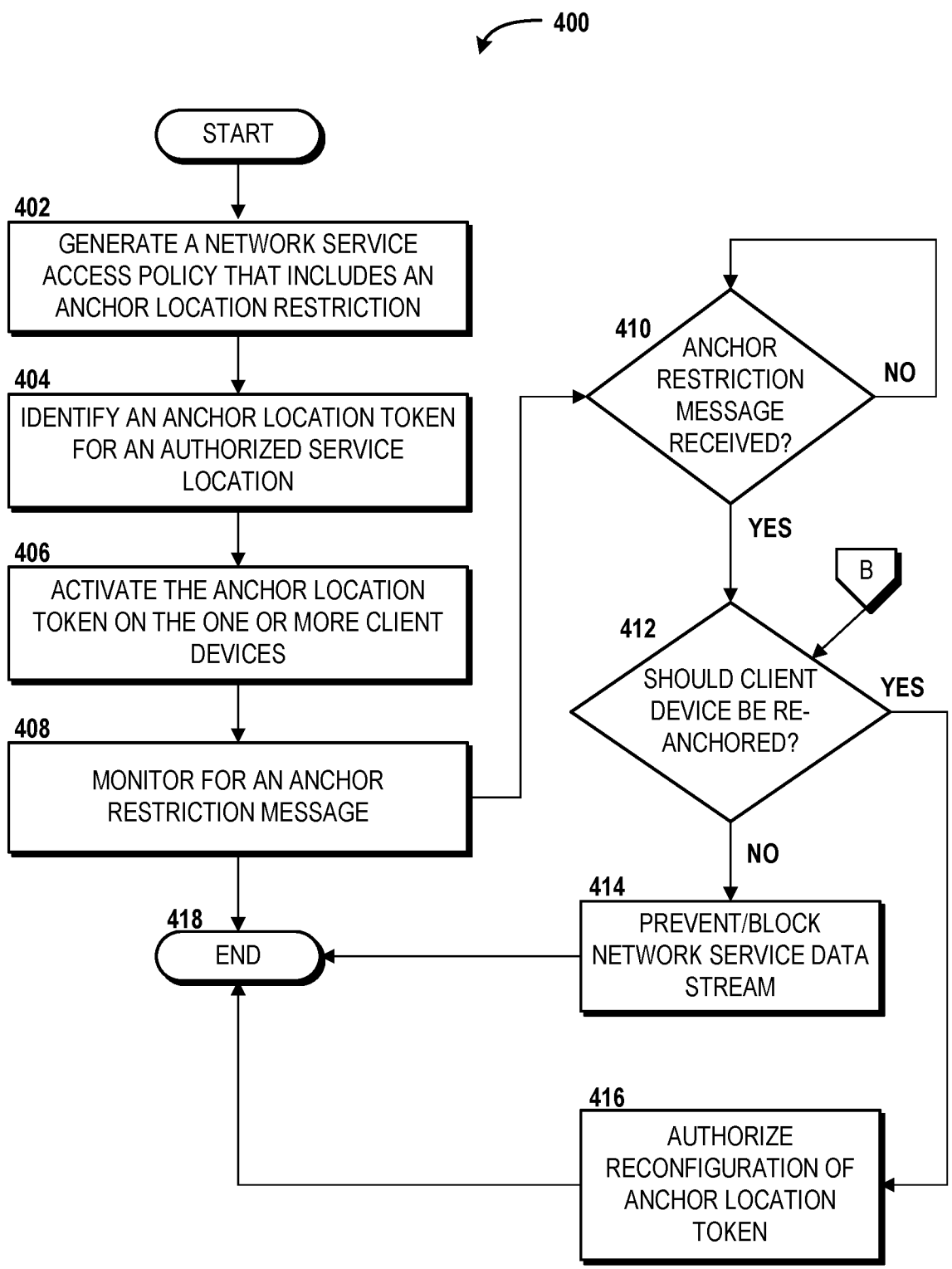
FIG. 4 is a flow diagram showing aspects of another method for providing network service access control, according to another illustrative embodiment of the concepts and technologies described herein.

Turning now to FIGS. 2, 3, and 4 with continued reference to FIG. 1, aspects of methods 200, 300, and 400 are provided according to illustrative embodiments. The method 200 is directed to anchoring a client device for network service access control, according to an illustrative embodiment. The method 300 is directed to detecting and determining whether a client device remains within an authorized service location without geolocation hardware communication components, according to an illustrative embodiment of the concepts and technologies described herein. The method 400 is directed to providing network service access control, according to another illustrative embodiment of the concepts and technologies described herein. It should be understood that the operations of the one or more methods disclosed herein (e.g., the method 200, the method 300, and/or a method 400 discussed below) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage medium, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multi-processor systems, minicomputers, user equipment, mainframe computers, personal computers, client devices, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the client devices 130A-N, the headend system 110, the network access point 124, the network service server 104, and/or any of the UEs 160A-N, 162A-N, and/or 164A-N to perform one or more operations and/or causing the processor to direct other components of the computing system or device to perform one or more of the operations.

For purposes of illustrating and describing the concepts of the present disclosure, the methods disclosed herein are described as being performed by an instance of a client device (e.g., the client device 130A) via execution of one or more software applications such as, for example, the anchor application 131 that configure one or more processors to perform operations discussed herein. It should be understood that additional and/or alternative devices and/or network nodes can, in some embodiments, provide at least some of the functionality described herein via execution of one or more modules, applications, and/or other software including, but not limited to, the network access point 124, the headend system 110, and/or the network service server 104. Thus, the illustrated embodiments are illustrative, and should not be viewed as being limiting in any way.

Turning now to FIG. 2, the method 200 begins at operation 202, where the client device 130A can receive the anchor instantiation command 136. In some embodiments, the anchor instantiation command 136 can be provided by a UE that is communicatively coupled to the client device 130A (e.g., the UE 160A), the headend system 110, the network service server 104, and/or in response to another anchoring trigger, such as by powering on the client device 130A or from the network service portal 105. The anchor instantiation command 136 can instruct the anchor application 131 to anchor one or more client devices (e.g., the client device 130A that is performing the operations and other communicatively coupled client devices, such as the client devices 130B-N, which should be associated with the authorized service location 120) to the authorized service location 120. The anchor instantiation command 136 can initiate the anchor instantiation time period 148, which designates the time over which the anchor location token 150 can be created, or in some embodiments, reconfigured. The client device 130A does not include geolocation hardware communication components. In some embodiments, the method 200 may proceed from operation 202 directly to operation 208, which will be discussed below in further detail. For clarity, a discussion of operation 204 will be provided first.

From operation 202, the method 200 can proceed to operation 204, where the client device 130A can invoke the supplemental anchor instruction 137. The supplemental anchor instruction 137 may be embedded within the anchor instantiation command 136 and/or be received as a separate instruction. In some embodiments, the anchor instantiation command 136 can prompt the anchor application 131 to create the supplemental anchor instruction 137. If the client device 130A is instructed to invoke the supplemental anchor instruction 137, then the method 200 can proceed along the YES path to operation 206. If the client device 130A is not instructed to invoke the supplemental anchor instruction 137, then the method 200 can proceed along the NO path from operation 204 to operation 208. For clarity, a discussion of operation 206 will be provided first, followed by a discussion of operation 208.

At operation 206, the supplemental anchor instruction 137 can be created by the client device 130A and be provided to a first UE, such as the UE 160B. The supplemental anchor instruction 137 can be configured to create the unique anchor display 138 that can be presented on the UE that is communicatively coupled to the client device 130A, such as the UE 160B. The unique anchor display 138 can be created so as to configure another (second) UE (e.g., the UE 160A) to invoke and execute the native geolocation application 161 on the other (second) UE 160A, and in turn causes the UE 160A to provide geolocation data 117 to the headend system 110. The geolocation data 117 may be generated by the UE 160A and provided directly to the headend system 110 without being routed through the client device 130A which provided the supplemental anchor instruction 137 to the UE 160B. The UE 160A may be configured to launch the native geolocation application 161 based on the UE 160A capturing the unique anchor display 138 that is presented on the UE 160B. From operation 206, the method 200 can proceed to operation 208.

At operation 208, the anchor application 131 can determine, during the anchor instantiation time period 148, a plurality of anchor attributes 140A-N associated with the one or more client devices 130A-N at the authorized service location 120. In some embodiments, the anchor attributes 140A-N can include or otherwise correspond with a network interface controller identifier (e.g., a media access control address), an instance of extended display identification data ("EDID" which can include includes information about a display's manufacturer, screen size, native resolution, color characteristics, frequency range limits, etc.), and a serial number corresponding to user equipment that is communicatively coupled to the one or more client devices 130A-N. The anchor attributes 140A-N can be captured by instances of the anchor attribute identifiers 141A-N and stored in one or more instances of the anchor attribute vector 151. As discussed with respect to FIG. 1, the anchor attribute identifiers 141A-N refer to and represent information provided by the instance of one of the anchor attribute 140A-N at the time of observation and/or detection by the anchor application 131. The anchor attribute identifiers 141A-N can capture the anchor attributes 140A-N in the format of a network address, a string, or other unique identifier corresponding with the anchor attributes 140A-N discussed herein. For example, the anchor attribute identifier 141A can indicate that the anchor attribute 140A corresponds with one of a network interface controller address (e.g., MAC address) of a particular UE (e.g., the UE 160B), a model or serial number, an international mobile equipment identity, an identifier of an active communication component interface (e.g., an HDMI identifier, wireless channel identifier, etc.), or any other identifier of the anchor attributes 140A-N discussed above to further define a signature of the authorized service location 120.

In some embodiments, the plurality of anchor attributes 140A-N can be determined by the anchor application 131 observing, detecting, and determining various information that is visible to the anchor application 131 via the communication components 133A-N and the communication component interfaces 139 so as to define the authorized service location 120. The anchor attributes 140A-N can be observed and/or determined by the anchor application 131 without reliance on geolocation hardware communication components, Service Set identifier information for Wi-Fi mapping, the geolocation data 117, GPS information, and/or cellular tower location triangulation. The anchor attributes 140A-N can correspond with, represent, and/or otherwise include information about the communication components 133A-N that are active and in use on the client device 130A for creation of the anchor location token 150. The anchor attributes 140A-N can also include information about and/or from the UEs coupled to the client device 130A creating the anchor location token 150 (e.g., the UEs 160A-N communicating with the client device 130A), information about and/or from the network access point 124 which provides the local client network 122 for the authorized service location 120, information about any other client devices also associated with the authorized service location 120 (e.g., the client devices 130B-N communicatively coupled to the network access point 124), and/or information about other UEs communicating with other client devices belonging to the authorized service location 120 (e.g., the UEs 162A-N and 164A-N communicating with the client devices 130B and 130N, respectively). In some embodiments, the anchor attributes 140A-N which are used to create the anchor location token 150 may be determined only during the anchor instantiation time period 148 based on the anchor attributes 140A-N collectively representing the authorized service location 120 without invoking the use of the geolocation data 117 within the anchor location token 150. Each of the anchor attributes 140A-N corresponds with an instance of information that is specific and/or unique to UEs (e.g., any of the UEs 160A-N, 162A-N, and/or 164A-N), client devices associated with the authorized service location 120 (any of the client devices 130A-N), and/or the network access point 124 that is and/or should be associated with the authorized service location 120. The anchor attributes 140A-N can serve as a basis by which the client device 130A can test to determine whether the anchor location token 150 matches its current observable communication environment, which is provided through the communication environment attribute set 147.

The anchor attributes 140A-N can correspond with information that is visible to the anchor application 131 on the client device 130A and/or visible to other client devices 130B-N that communicatively couple to the same network access point (e.g., the network access point 124) associated with the authorized service location 120. As such, one or more of the anchor attributes 140A-N may be associated with UEs which are not directly connected and/or not directly observable to the client device that creates the anchor location token 150, but rather are indirectly observable to the other client devices that share the same network access point 124 (e.g., the client devices 130B-N).

From operation 208, the method 200 can proceed to operation 210, where the anchor application 131 can create the anchor location token 150. The anchor location token 150 can define and/or represent the authorized service location 120 based on the plurality of anchor attributes 140A-N that were determined during the anchor instantiation time period 148. The anchor location token 150 can be configured to prevent the network service data stream 115 from being routed through the client device 130A in response to the client device 130A moving outside of the authorized service location 120, which can be determined according to one or more operations discussed herein. The anchor location token 150 can be created by generating one or more anchor attribute vectors 151 that each include and correspond with one of the anchor attributes 140A-N. The anchor application 131 can determine a penalty value and a penalty decay value for each of the corresponding anchor attributes 140A-N, such as one of the penalty values 144A-N and the penalty decay values 143A-N. Each penalty value and penalty decay value may be assigned a numerical value between a lower boundary (e.g., 0.0) and an upper boundary (e.g., 1.0), where the upper boundary indicates a greater probability that the client device 130A has moved outside of the authorized service location 120. The anchor location token 150 may be opaque or otherwise encrypted from unauthorized applications, thereby preventing nefarious applications from spoofing and/or falsely providing current readings of anchor attributes within the communication environment attribute set 147.

From operation 210, the method 200 can proceed to operation 212, where the anchor application 131 can instantiate an instance of an anchor location token 150 on at least one of the one or more client devices 130B-N at the authorized service location 120. For example, the anchor application 131 can create duplicates of the anchor location token 150, which may be represented as the anchor location tokens 150' and 150". The anchor location tokens 150' and 150" can be provided to the client devices 130B-N for instantiation in their memory. In some embodiments, the anchor application 131 may also create the anchor location token 150''', which may also be a duplicate of and represent the anchor location token 150.

From operation 212, the method 200 can proceed to operation 214, where the anchor application 131 can provide the anchor location token 150''' to the headend system 110. The headend system 110 can provide independent confirmation as to whether the client device 130A has moved outside of the authorized service location 120. In some embodiments, the client device 130A can send the communication environment attribute set 147 to the headend system 110 after every expiration of the anchored time period 149. In some embodiments, the method 200 can proceed from operation 214 to operation 222, where the method 200 can end. In some embodiments, the method 200 can, alternatively, proceed from operation 214 to operation 216.

At operation 216, the anchor application 131 can assemble the communication environment attribute set 147 after the anchor instantiation time period 148 ends. The communication environment attribute set 147 can be based on the plurality of anchor attributes 140A-N that were used and included in the anchor location token 150. Specifically, the anchor application 131 can observe and detect the same anchor attribute identifiers 141A-N that are stored in the anchor location token 150. The anchor application 131 can update the anchor attribute identifiers 141A-N during and/or after the anchored time period 149. The communication environment attribute set 147 can provide current readings and status as to the anchor attributes 140A-N that are used to represent and define the authorized service location 120 without reliance on the geolocation data 117. Thus, the communication environment attribute set 147 can serve as a basis to test whether there exist changes or deviations from the baseline readings provided by the anchor location token 150, and enable the anchor application 131 to determine whether those deviations are significant enough to consider the client device 130A to be no longer located at the authorized service location 120 (e.g., whether enough of the penalty values 144A-N accumulate within the deviation indication vector 152 to exceed the anchor threshold 146).

From operation 216, the method 200 can proceed to operation 218, where the anchor application 131 detects and determines whether the client device 130A has moved outside of the authorized service location 120 based on the anchor location token 150 and the communication environment attribute set 147. Specifically, the anchor application 131 can compare the anchor attribute identifiers 141A-N that are observed during the anchored time period 149 (i.e., after the anchor instantiation time period 148 ends) and compare them against the anchor location token 150 (e.g., the anchor attribute identifiers stored in the anchor attribute vectors 151 of the anchor location token 150). If the one or more instance of the anchor attribute vector 151 does not match the communication environment attribute set 147, then the anchor application 131 can pull the corresponding penalty value for the deviated anchor attribute and populate the deviation indication vector 152. If the deviation indication vector 152 meets or exceeds the anchor threshold 146, then the anchor application 131 determines that the client device 130A is outside of the authorized service location 120, which in turn allows the method 200 to proceed along the YES path to operation 220. If the deviation indication vector 152 of the anchor location token 150 does not exceed the anchor threshold 146, then the method 200 can proceed from operation 218 along the NO path to operation 216, where the anchor application can assemble the communication environment attribute set 147, such as by updating the anchor attribute identifiers 141A-N as they are currently observed after the anchor instantiation time period 148 ends.

At operation 220, the client device 130A can prevent an instance of the network service data stream 115 from being routed through the client device 130A (e.g., via the communication components 133A-N) to one or more communicatively coupled UEs (e.g., the UEs 160A-N). The client device 130A can prevent or otherwise block the network service data stream 115 in response to detecting that the client device 130A has moved outside of the authorized service location 120. From operation 220, the method 200 can proceed to operation 222, where the method 200 can end.

Turning now to FIG. 3, the method 300 will be described. The method 300 can provide operations that enable the performance of operations discussed herein, such as operation 218 of FIG. 2, according to an illustrative embodiment. The method 300 can begin and proceed to operation 302, where the anchor application 131 can analyze the anchor location token 150 and the communication environment attribute set 147. Specifically, the anchor application 131 can analyze the anchor attribute identifiers 141A-N within the anchor attribute vectors 151 of the anchor location token 150 and compare against the current readings of the anchor attribute identifiers 141A-N within the communication environment attribute set 147.

From operation 302, the method 300 can proceed to operation 303, where the anchor application 131 can determine whether the anchor attribute identifiers 141A-N corresponding with the anchor attributes 140A-N within the anchor location token 150 are the same as currently observed anchor attributes 140A-N reflected and represented in the communication environment attribute set 147. If one of the new (currently observed) anchor attribute identifiers 141A-N within the communication environment attribute set 147 matches the anchor attribute identifiers that are stored in the anchor location token 150, then the method 300 can proceed along the YES path to operation 304, where the anchor application 131 can analyze and look to the next anchor attribute identifier within the communication environment attribute set 147, which in turn can allow the method 300 to proceed to operation 303 to perform the operation 303 on the next anchor attribute identifier. If new anchor attribute identifiers within the communication environment attribute set 147 are found to deviate from the anchor location token 150 and/or the anchor attribute identifiers are not found or detected (e.g., anchor attributes that are expected to be present when the client device 130A is located in the authorized service location 120, but are not being detected because either the client device 130A is outside of the authorized service location 120 or the UE providing the anchor attribute is not connected or is no longer in the authorized service location 120), then the method 300 can proceed along the NO path to operation 305 so that the anchor application 131 can identify the corresponding anchor attribute vector 151 within the anchor location token 150 so as to proceed with determination of movement outside of the authorized service location 120.

At operation 305, the anchor application 131 can detect changes and/or deviations in single anchor attribute identifiers 141A-N as they are represented between the anchor location token 150 and the communication environment attribute set 147. Stated differently, the anchor application 131 updates the communication environment attribute set 147 after the anchor instantiation time period 148 ends so that the current status of the authorized service location 120 is detected through observation of the anchor attributes 140A-N that are represented by the anchor attribute identifiers 141A-N that are reflected in the communication environment attribute set 147. If any of the anchor attribute identifiers 141A-N provided by the communication environment attribute set 147 do not match those provided by the anchor attribute vector 151 of the anchor location token 150, then the anchor application 131 detects a change or deviation and extracts the corresponding penalty value (e.g., one of the penalty values 144A-N) from the corresponding anchor attribute vector 151.

From operation 305, the method 300 can proceed to operation 306, where the anchor application 131 can accumulate the single instances of changes to the anchor attribute identifiers 141A-N that are detected between the anchor location token 150 and the communication environment attribute set 147. For example, if the anchor attribute identifiers 141A and 141B are determined to differ between the anchor location token 150 and the communication environment attribute set 147, then the anchor application 131 can pull the penalty values 144A and 144B for use in populating the deviation indication vector 152.

From operation 306, the method 300 can proceed to operation 308, where anchor application 131 can create and/or populate the deviation indication vector 152 based on the changes detected pertaining to the anchor attribute identifiers 141A-N. For example, the anchor application 131 can populate the deviation indication vector 152 with each penalty value 144A and 144B corresponding to the anchor attributes 140A and 140B which indicated a deviation or change between the anchor location token 150 and the communication environment attribute set 147. Each of the penalty values 144A-N that is used to populate the deviation indication vector 152 may not have the same numerical value but instead be based on the uniqueness of the corresponding anchor attribute, where the penalty value may indicate a value that is closer to the upper boundary when the anchor attribute is unique to the authorized service location 120 and/or the UE from which the anchor attribute is detected and/or observed. As such, penalty values that are closer to the upper boundary (e.g., 1.0) can indicate that the client device 130A have a higher probability (i.e., greater likelihood) of being located outside of the authorized service location 120.

In various embodiments, the amount of changes or deviations that are allowed to occur during a given time period (e.g., the anchored time period 149) may vary depending on the configuration of the anchor location token's 150 penalty decay values 143A-N. In some embodiments, the changes in the anchor attribute identifiers are gradually and/or rapidly forgotten based on the penalty decay values 143A-N. For example, the anchor location token 150 can allow the client device 130A to be communicatively coupled to a different smart television (or other IoT device) within one month (which may be the length of time provided by the anchored time period 149), but the anchor location token 150 would disallow a second change within the month. This may be because the penalty value associated with the first change of being coupled to the different smart television was not enough to cause the deviation indication vector 152 to exceed the anchor threshold 146. The penalty decay value corresponding to the penalty value for connecting to the different television may have begun to decay the effects of the penalty value, however if a second change were to occur within the month (i.e., within the anchored time period 149), then another penalty value would be added to the deviation indication vector 152, thereby potentially causing the anchor threshold 146 to be exceeded. Therefore, the network service access policy 112 can be set and define whether penalty values and penalty decay values should be adapted dynamically and automatically, or instead require reconfiguration through the network service portal 105 or a customer care representative. In some embodiments, when multiple anchor attribute identifiers change, each of the corresponding penalty values may be pulled and provided to the deviation indication vector 152 for accumulation. For example, the anchor location token 150 may allow a monthly change to a connected television, or a quarterly change to a router, but disallow changes to both the television and router during the same time frame (e.g., during the same anchored time period 149). The anchor location token 150 can be configured so that a move in the client device 130A away from the authorized service location 120 can be reversed, such as by advising the user 128 to connect the client device 130A in its original configuration so as to re-enable instances of the network service data stream 115 to be provided via the client device 130A. In some embodiments, the changes to the anchor attribute identifiers that incur penalty values to be accumulated may not be forgiven or decay over time, but rather may accumulate during the life of the client device 130A. As such, the anchor threshold 146 may be adjusted based on the amount of changes that are acceptable according to the network service access policy 112.

From operation 308, the method 300 can proceed to operation 310, where the anchor application 131 determines whether the anchor location token 150 indicates a deviation in the anchor attributes 140A-N that exceeds the anchor threshold 146. Specifically, the anchor application 131 can determine whether the accumulated penalty value represented by the deviation indication vector 152 meets or exceeds the anchor threshold 146. If the deviation indication vector 152 does not meet or exceed the anchor threshold 146 (i.e., is below the anchor threshold 146 during an instance of the anchored time period 149), then the method 300 can proceed along the NO path to operation 314. If the deviation indication vector 152 meets or exceeds the anchor threshold 146, then the method 300 can proceed along the YES path to operation 312. For clarity, operation 314 will be discussed followed by operation 312.

At operation 314, the anchor application 131 can determine that the client device 130A remains within the authorized service location 120 over the anchored time period 149. When the anchored time period 149 ends, the anchor application 131 can continue monitoring for changes and deviations in the currently observed anchor attributes 140A-N compared to those recorded in the anchor location token 150. As such, in some embodiments, the method 300 can proceed from operation 314 to operation 302. In other embodiments, the method 300 can proceed from operation 314 to operation 316, where the method 300 can end.

Returning to operation 310, if the deviation indication vector 152 of the anchor location token 150 deviates or otherwise meets or exceeds the anchor threshold 146, then the method 300 can proceed along the YES path to operation 312, where the anchor application 131 determines that the client device (e.g., the client device 130A executing the anchor application 131) is outside of the authorized service location 120. In some embodiments, the anchor application 131 may generate and send an anchor restriction message 116 to the headend system 110 in response to determining that the client device 130A is no longer within the authorized service location 120. In some embodiments, the method 300 can proceed from operation 312 to an operation discussed with respect to FIG. 2 or FIG. 4, such as the operation 220 or operation 412, respectively. In some embodiments, the method 300 can proceed from operation 312 to operation 316, where the method can end.

Turning now to FIG. 4, the method 400 will be described, according to an illustrative embodiment of the concepts and technologies disclosed herein. In some embodiments, one or more operations of the method 400 may be performed by a device or system outside of the authorized service location 120 (e.g., the headend system 110 and/or the network service server 104), although this may not necessarily be the case. In some embodiments, one or more operations can be performed by an instance of the anchor application 131 executing on a client device (e.g., the client device 130A). For clarity purposes, the method 400 will be described as being performed by the headend system 110, according to an illustrative embodiment. It is understood that in some embodiments, the client device 130A may perform one or more operations of the method 400, such as the operations 412, 414, and 416.

The method 400 begins and proceeds to operation 402, where the headend system 110 can generate the network service access policy 112 that includes the anchor location restriction 113 for the network service 108. In turn, this can, in some embodiments, trigger an instance of the anchor instantiation command 136 to be provided to the anchor application 131, such as executing on the client device 130A. In some embodiments, the headend system 110 can receive the anchor location token 150''' in response to providing the anchor instantiation command 136, where the anchor location token 150''' defines and represents the authorized service location 120 without reliance on the geolocation data 117.

From operation 402, the method 400 can proceed to operation 404, where the headend system 110 can identify the anchor location token 150''' that is associated with the authorized service location 120. The headend system 110 can refer to the authorized service location identifier 135 that may be stored in the anchor location token 150''' to represent the authorized service location 120.

From operation 404, the method 400 can proceed to operation 406, where the headend system 110 can activate the anchor location token 150''' on one or more client devices 130A-N. For example, the headend system 110 may inform the client device 130A that the network service 108 and the network service data stream 115 is associated with the anchor location restriction 113, and therefore the client device 130A should monitor and self-assess whether the client device 130A remains within the authorized service location 120. The client device 130A can begin using the anchor location token 150 that is stored on the client device 130A to determine whether it has moved outside of the authorized service location 120.

From operation 406, the method 400 can proceed to operation 408, where the headend system 110 can monitor for an anchor restriction message, such as the anchor restriction message 116 that may be sent by the client device 130A in response to determining that the client device 130A has moved outside of the authorized service location 120. In some embodiments, the method 400 can proceed from operation 408 to operation 418, where the method 400 can end.

From operation 408, the method 400 can proceed to operation 410, where the headend system 110 can determine whether the anchor restriction message 116 has been received. The anchor restriction message 116 can indicate that the client device 130A has moved away from the authorized service location 120 and therefore is in violation of the network service access policy 112. In turn, the client device 130A may not be eligible to receive and distribute instances of the network service data stream 115 to UEs outside of the authorized service location 120. If the anchor restriction message 116 has not been received, then the headend system 110 may proceed along the NO path to perform operation 410 again by continuing to monitor and determine whether the anchor restriction message 116 has been received. Once the anchor restriction message 116 has been received by the headend system 110, the method 400 can proceed along the YES path to operation 412.

At operation 412, the headend system 110 can determine whether the client device 130A which provided the anchor restriction message 116 should be re-anchored to another location, such as the unaffiliated authorized service location 119 or the unauthorized service location 118. In some embodiments, the headend system 110 may analyze the network service profile 106 associated with the client device 130A to determine that the client device 130A is not authorized to receive the network service data stream 115 at multiple locations, and therefore may restrict the client device 130A from being re-anchored. If the client device 130A is not authorized to be re-anchored to another location, then the method 400 can proceed along the NO path to operation 414.

At operation 414, the headend system 110 may prevent and/or block an instance of the network service data stream 115 from being distributed via the client device 130A while the client device 130A remains outside of the authorized service location 120. In some embodiments, the headend system 110 may forward the anchor restriction message 116 to a network access point within the other location in which the client device 130A is current located (e.g., the unauthorized service location 118 and/or the unaffiliated authorized service location 119) so as to prevent the network service data stream 115 from reaching the client device 130A outside of the authorized service location 120. From operation 414, the method 400 can proceed to operation 418, where the method 400 can end.

Returning to operation 412, the headend system 110 may analyze the network service profile 106 associated with the client device 130A and determine that the client device is authorized to be anchored at another location (e.g., the unaffiliated authorized service location 119). If the client device that is determined to be outside of the authorized service location 120 should be re-anchored to another location that is not the authorized service location 120 (e.g., the unaffiliated authorized service location 119 and/or the unauthorized service location 118), then the method 400 can proceed from operation 412 along the YES path to operation 416. At operation 416, the headend system 110 can authorize reconfiguration of the anchor location token 150 to account for changes in location. In some embodiments, a separate anchor location token may be created for the new location so as to keep the anchor location token 150 tied specifically to the authorized service location 120. In some embodiments, one or more UEs may be added or removed from the authorized service location 120, thereby giving the appearance that the client device 130A is no longer at the authorized service location 120. In this embodiment, the network service portal 105 may be accessed and the headend system 110 can authorize reconfiguration of the anchor location token 150 so as to account for the changes in the amount and/or type of UEs (and therefore anchor attributes) within the authorized service location 120. From operation 416, the method 400 can proceed to operation 418, where the method 400 can end. It is understood that the examples provided are for illustration purposes only, and therefore should not be construed as limiting the scope of the concepts and technologies disclosed herein.

Figure 5:
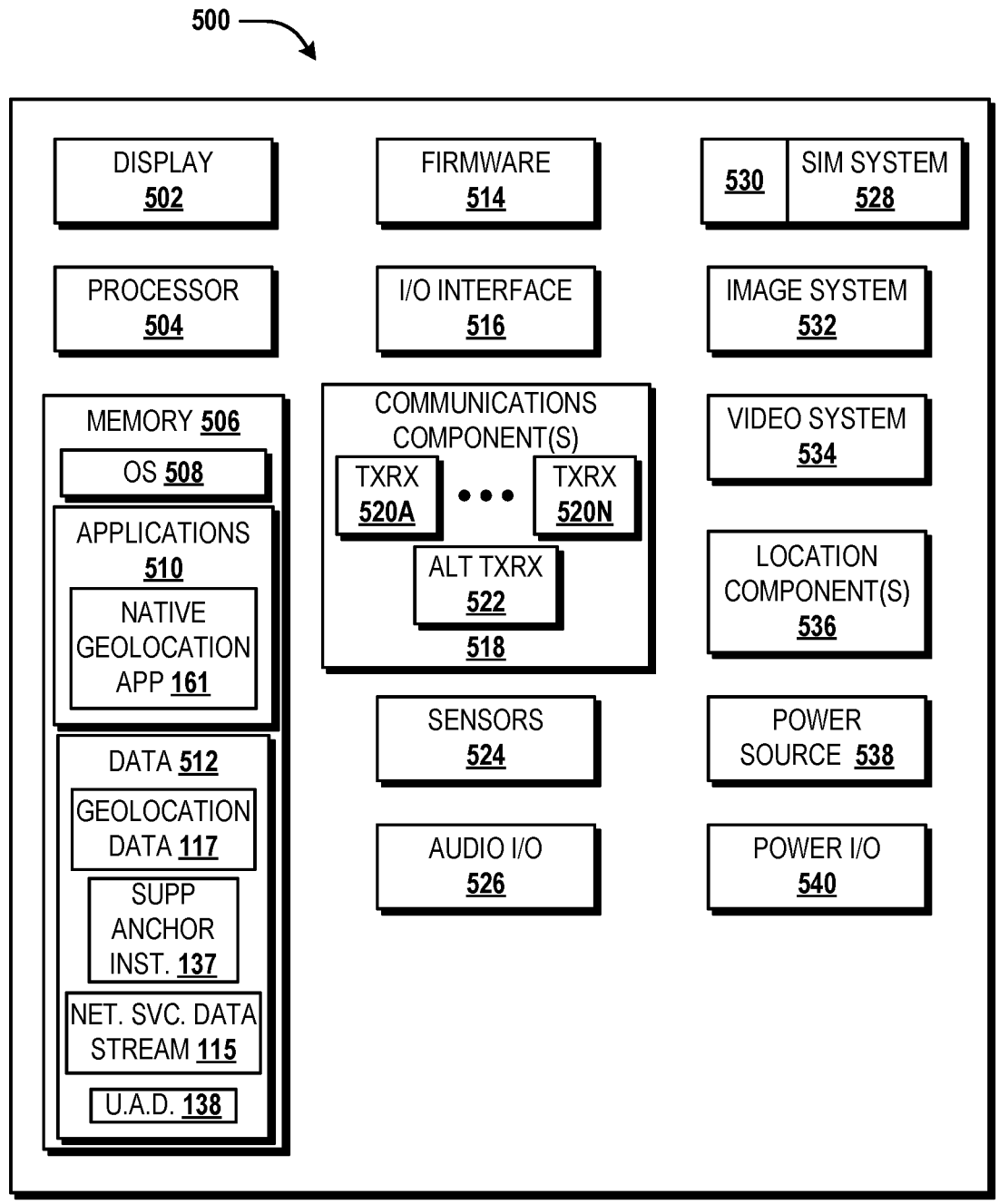
FIG. 5 is a block diagram illustrating an example user equipment capable of implementing aspects according to embodiments of the concepts and technologies described herein.

Turning now to FIG. 5, an illustrative user equipment 500 and components thereof will be described. In some embodiments, one or more of the UEs 160A-N, 162A-N, 164A-N and the network access point 124 (shown in FIG. 1) can be configured like the user equipment 500. It is understood that the user equipment 500 can be configured to take the form of a mobile communication device, a tablet, a wearable computing device, a heads-up display computer system, an augmented reality ("AR") device, a virtual reality ("VR") device, a vehicle computing system, an attachable computing device, a camera, an appliance (e.g., a refrigerator, an oven, a microwave, etc.), a television, a handheld device, a combination thereof, or other user equipment that can implement network communications. It is understood that the examples discussed above are used for illustration purposes only, and therefore should not be construed to limit the scope of the disclosure in any way. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the user equipment 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The user equipment 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5). The phrase "computer-executable instructions" may also be referred to as "computer-readable instructions."

The UI application can interface with the operating system 508 to facilitate user interaction with functionality and/or data stored at the user equipment 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in interacting or otherwise entering/deleting data, entering and setting local credentials (e.g., user IDs and passwords) for device access, configuring settings, manipulating address book content and/or settings, multimode interaction, interacting with other applications 510, and otherwise facilitating user interaction with the operating system 508, the applications 510, and/or other types or instances of data 512 that can be stored at the user equipment 500. The data 512 can include, for example, one or more identifiers, and/or other applications or program modules. In some embodiments, the data 512 can include one or more of the geolocation data 117, the supplemental anchor instruction 137, the network service data stream 115, the unique anchor display 138, and/or other data sent among and/or between the UEs 160A-N, 162A-N, 164A-N, the network access point 124, the headend system 110, and/or the network service server 104. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. In some embodiments, the applications 510 can include the native geolocation application 161. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The user equipment 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the user equipment 500 can be configured to synchronize with another device to transfer content to and/or from the user equipment 500. In some embodiments, the user equipment 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the user equipment 500 and a network device or local device.

The user equipment 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The user equipment 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the user equipment 500 may be provided by an audio I/O component 526. The audio I/O component 526 of the user equipment 500 can include one or more speakers for the output of audio signals, one or more microphones for the collection and/or input of audio signals, and/or other audio input and/or output devices.

The illustrated user equipment 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the user equipment 500 are contemplated, it should be understood that these embodiments are illustrative, and should not be construed as being limiting in any way.

The user equipment 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The user equipment 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The user equipment 500 also can include one or more location components 536, which may in some embodiments be referred to a geolocation hardware communication components. The location components 536 can be configured to send and/or receive signals to determine a geographic location of the user equipment 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the user equipment 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the user equipment 500. Using the location component 536, the user equipment 500 can generate and/or receive data to identify its geographic location (e.g., the geolocation data 117), or to transmit data used by other devices to determine the location of the user equipment 500. The location component 536 may include multiple components for determining the location and/or orientation of the user equipment 500. As used herein, discussion of "geolocation hardware communication components" with respect to FIG. 1 can refer to embodiments of the location components 536. As such, in various embodiments, the client devices 130A-N do not include an instance of the location component 536, and therefore the authorized service location 120 is defined and represented without reliance on the location component 536 and/or geolocation data (e.g., the geolocation data 117).

The illustrated user equipment 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the user equipment 500 can include additional and/or alternative components, the above embodiment should be understood as being illustrative of one possible operating environment for various embodiments of the concepts and technologies described herein. The described embodiment of the user equipment 500 is illustrative, and should not be construed as being limiting in any way.

Figure 6:
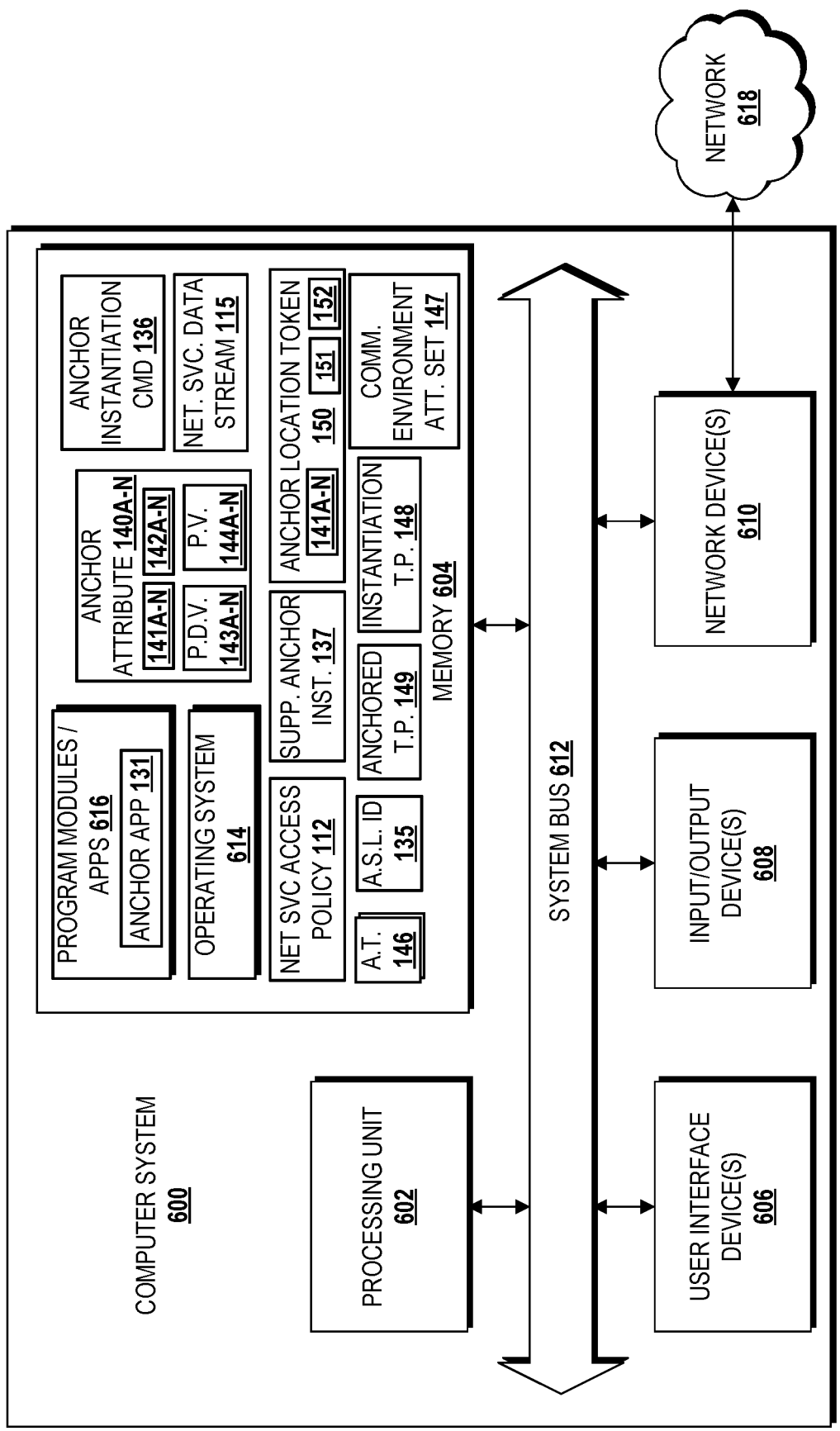
FIG. 6 is a block diagram illustrating an example computer system configured to provide, implement, and execute operations according to at least some illustrative embodiments of the concepts and technologies described herein.

Turning now to FIG. 6 is a block diagram illustrating a computer system 600 configured to provide the functionality in accordance with various embodiments of the concepts and technologies disclosed herein. The systems, devices, and other components disclosed herein can utilize, at least in part, an architecture that is the same as or at least similar to the architecture of the computer system 600. In some embodiments, one or more of the client devices 130A-N, the network access point 124, the headend system 110, and/or the network service server 104 can be configured like the computer system 600. It should be understood, however, that modification to the architecture may be made to facilitate certain interactions among elements described herein.

The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 134 can be configured as the memory 604. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. In some embodiments, for example, the program modules 616 can include the anchor application 131 and/or other program modules. These and/or other programs can be embodied in computer-readable medium including instructions that, when executed by the processing unit 602, in some embodiments, may perform and/or facilitate performance of one or more of the operations discussed with respect to FIGS. 1, 2, 3, 4 and the methods 200, 300, and the method 400, described in detail above with respect to FIGS. 2, 3, and 4. According to some embodiments, the program modules 616 may be embodied in hardware, software, firmware, or any combination thereof. In some embodiments, the memory 604 also can be configured to store one or more elements discussed with respect to FIG. 1, such as the network service access policy 112, the anchor threshold 146, the authorized service location identifier 135, the anchored time period 149, the anchor instantiation time period 148, the supplemental anchor instruction 137, anchor attributes 140A-N, the anchor attribute identifiers 141A-N, the attribute values 142A-N, the penalty values 144A-N, the penalty decay values 143A-N, the anchor instantiation command 136, the network service data stream 115, the anchor location token 150, the anchor attribute vector 151, the deviation indication vector 152, the communication environment attribute set 147, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer. In some embodiments, the I/O devices 608 can be used for manual controls for operations to exercise under certain emergency situations.

The network devices 610 enable the computer system 600 to communicate with other networks or remote systems via a network 618, such as the network 102 and/or the local client network 122. Examples of the network devices 610 include, but are not limited to, a modem, a radio frequency ("RF") or infrared ("IR") transceiver, a telephonic interface, a bridge, a router, or a network card. The network 618 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, or any other mobile network and/or wireline network. In some embodiments, the network devices 610 may not provide geolocation hardware communication components, such as when the computer system 600 is configured as one of the client devices 130A-N.

Figure 7:
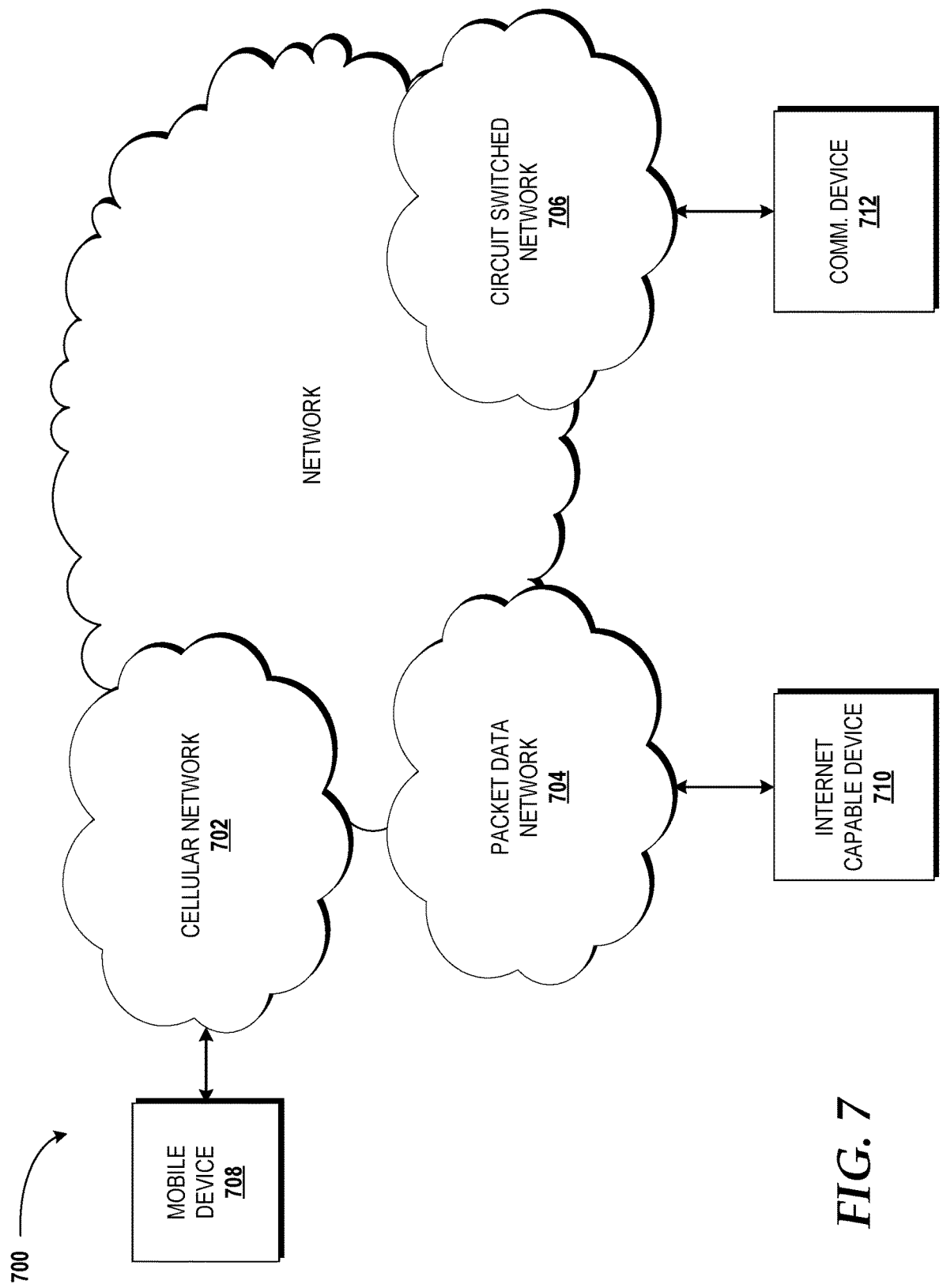
FIG. 7 is a block diagram illustrating an example network capable of implementing aspects of the concepts and technologies described herein.

Turning now to FIG. 7, details of a network 700 are illustrated, according to an illustrative embodiment. In some embodiments, one or more of the network 102 and/or the local client network 122 can be configured, at least in part, as the network 700. The network 700 includes a cellular network 702, a packet data network 704, for example, the Internet, and a circuit switched network 706, for example, a PSTN. The cellular network 702 includes various network components such as, but not limited to, base transceiver stations ("BTSs"), NBs, eNBs, gNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706. In some embodiments, the network 102 of FIG. 1 can operate as the packet data network 704, and the local client network 122 can operate in cooperation with the cellular network 702 or another instance of the packet data network 704.

The mobile communications device 708, such as, for example, a cellular telephone, a mobile terminal, a PDA, a laptop computer, a user equipment, a handheld computer, and combinations thereof, can be operatively connected to the cellular network 702. In some embodiments, one or more of the UEs 160A-N, 162A-N, and/or 164A-N can be configured as the mobile communications device 708. The cellular network 702 can be configured as a 2G GSM network, or other network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also can be compatible with 4G and 5G mobile communications standards such as LTE, or the like, as well as evolved and future mobile standards, including but not limited to LTE-Advanced, LTE-Advanced Pro and 5G.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. In some embodiments, the at least some of the network 102 can be configured as a packet data network, such as the packet data network 704. The circuit switched network 706 includes various hardware and software for providing circuit switched communications. The circuit switched network 706 may include, or may be, what is often referred to as a POTS. In some embodiments, the at least some of the network 102 also can be configured as a circuit switched network, such as the circuit switched network 706. The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network of FIG. 7 is used to refer broadly to any combination of the networks 702, 704, 706 shown in FIG. 7. It should be appreciated that, in some embodiments, substantially all of the functionality described with reference to the network 102 and/or the local client network 122 can be performed by the cellular network 702, the packet data network 704, and/or the circuit switched network 706, alone or in combination with other networks, network elements, and the like, according at least to aspects of the features and operations discussed herein.

Based on the foregoing, it should be appreciated that concepts and technologies directed to anchoring client devices for network service access control have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A client device comprising:
a processor; and
a memory that stores computer-executable instructions that, in response to execution by the processor, cause the processor to perform operations comprising:
receiving an anchor instantiation command to anchor the client device to an authorized service location, wherein the authorized service location corresponds to a location at which a network service is authorized, wherein the anchor instantiation command initiates an anchor instantiation time period, and wherein the client device is located at the authorized service location during the anchor instantiation time period,
determining, during the anchor instantiation time period, a first plurality of anchor attributes associated with the client device located at the authorized service location,
creating an anchor location token that represents the authorized service location based on the first plurality of anchor attributes that were determined during the anchor instantiation time period, wherein each of the first plurality of anchor attributes is represented within the anchor location token as a corresponding anchor attribute vector, wherein each anchor attribute vector comprises a corresponding penalty value and a corresponding penalty decay value, wherein the corresponding penalty value represents a probability that a change in a corresponding anchor attribute indicates that the client device has moved away from the authorized service location, and wherein the corresponding penalty decay value provides a rate at which the corresponding penalty value will be diminished,
subsequent to the anchor instantiation time period, determining a second plurality of anchor attributes associated with the client device, and
comparing the first plurality of anchor attributes to the second plurality of anchor attributes to determine whether the client device remains at the authorized service location where the network service is authorized.

2. The client device of claim 1, wherein the anchor location token is configured to prevent a network service data stream associated with the network service from being routed through the client device in response to the client device moving outside of the authorized service location.

3. The client device of claim 1, wherein the operations further comprise:
instantiating an instance of the anchor location token on at least the client device located at the authorized service location; and
providing the anchor location token to a headend system.

4. The client device of claim 1, wherein the first plurality of anchor attributes comprise a network interface controller identifier, an instance of extended display identification data, and a serial number corresponding to user equipment that is communicatively coupled to the client device.

5. The client device of claim 1, wherein the operations further comprise assembling a communication environment attribute set based on the second plurality of anchor attributes determined subsequent to the anchor instantiation time period.

6. The client device of claim 1, wherein determining the first plurality of anchor attributes associated with the client device located at the authorized service location comprises at least one of determining communication components of the client device that are active on the client device during the anchor instantiation time period, determining information about a user equipment coupled to the client device during the anchor instantiation time period, determining information about a network access point that provides a local client network for the authorized service location, or determining information about other client devices also associated with the authorized service location during the anchor instantiation time period.

7. The client device of claim 1, wherein the operations further comprise in response to detecting that the client device has moved outside of the authorized service location, preventing a network service data stream associated with the network service from being routed through the client device.

8. A method comprising:
receiving, by a client device, an anchor instantiation command to anchor the client device to an authorized service location, wherein the authorized service location corresponds to a location at which a network service is authorized, wherein the anchor instantiation command initiates an anchor instantiation time period, and wherein the client device is located at the authorized service location during the anchor instantiation time period;
determining, by the client device during the anchor instantiation time period, a first plurality of anchor attributes associated with the client device located at the authorized service location;
creating, by the client device, an anchor location token that represents the authorized service location based on the first plurality of anchor attributes that were determined during the anchor instantiation time period, wherein each of the first plurality of anchor attributes is represented within the anchor location token as a corresponding anchor attribute vector, wherein each anchor attribute vector comprises a corresponding penalty value and a corresponding penalty decay value, wherein the corresponding penalty value represents a probability that a change in a corresponding anchor attribute indicates that the client device has moved away from the authorized service location, and wherein the corresponding penalty decay value provides a rate at which the corresponding penalty value will be diminished;
subsequent to the anchor instantiation time period, determining, by the client device, a second plurality of anchor attributes associated with the client device; and
comparing, by the client device, the first plurality of anchor attributes to the second plurality of anchor attributes to determine whether the client device remains at the authorized service location where the network service is authorized.

9. The method of claim 8, wherein the anchor location token is configured to prevent a network service data stream associated with the network service from being routed through the client device in response to the client device moving outside of the authorized service location.

10. The method of claim 8, further comprising:
instantiating, via the client device an instance of the anchor location token on at least the client device at the authorized service location; and
providing, via the client device, the anchor location token to a headend system.

11. The method of claim 8, wherein the first plurality of anchor attributes comprise a network interface controller identifier, an instance of extended display identification data, and a serial number corresponding to user equipment that is communicatively coupled to the client device.

12. The method of claim 8, further comprising assembling, by the client device, a communication environment attribute set based on the second plurality of anchor attributes determined subsequent to the anchor instantiation time period.

13. The method of claim 8, wherein determining the first plurality of anchor attributes associated with the client device located at the authorized service location comprises at least one of determining communication components of the client device that are active on the client device during the anchor instantiation time period, determining information about a user equipment coupled to the client device during the anchor instantiation time period, determining information about a network access point that provides a local client network for the authorized service location, or determining information about other client devices also associated with the authorized service location during the anchor instantiation time period.

14. The method of claim 8, further comprising in response to detecting that the client device has moved outside of the authorized service location, preventing, by the client device, a network service data stream associated with the network service from being routed through the client device.

15. A computer storage medium having computer-executable instructions stored thereon that, in response to execution by a processor of a client device, cause the processor to perform operations comprising:
receiving an anchor instantiation command to anchor the client device to an authorized service location, wherein the authorized service location corresponds to a location at which a network service is authorized, wherein the anchor instantiation command initiates an anchor instantiation time period, and wherein the client device is located at the authorized service location during the anchor instantiation time period;
determining, during the anchor instantiation time period, a first plurality of anchor attributes associated with the client device located at the authorized service location;
creating an anchor location token that represents the authorized service location based on the first plurality of anchor attributes that were determined during the anchor instantiation time period, wherein each of the first plurality of anchor attributes is represented within the anchor location token as a corresponding anchor attribute vector, wherein each anchor attribute vector comprises a corresponding penalty value and a corresponding penalty decay value, wherein the corresponding penalty value represents a probability that a change in a corresponding anchor attribute indicates that the client device has moved away from the authorized service location, and wherein the corresponding penalty decay value provides a rate at which the corresponding penalty value will be diminished;
subsequent to the anchor instantiation time period, determining a second plurality of anchor attributes associated with the client device; and
comparing the first plurality of anchor attributes to the second plurality of anchor attributes to determine whether the client device remains at the authorized service location where the network service is authorized.

16. The computer storage medium of claim 15, wherein the anchor location token is configured to prevent a network service data stream associated with the network service from being routed through the client device in response to the client device moving outside of the authorized service location.

17. The computer storage medium of claim 15, wherein the operations further comprise:
   instantiating an instance of the anchor location token on at least the client device at the authorized service location; and
   providing the anchor location token to a headend system.

18. The computer storage medium of claim 15, wherein determining the first plurality of anchor attributes associated with the client device located at the authorized service location comprises at least one of determining communication components of the client device that are active on the client device during the anchor instantiation time period, determining information about a user equipment coupled to the client device during the anchor instantiation time period, determining information about a network access point that provides a local client network for the authorized service location, or determining information about other client devices also associated with the authorized service location during the anchor instantiation time period.

19. The computer storage medium of claim 15, wherein the operations further comprise assembling a communication environment attribute set based on the second plurality of anchor attributes determined subsequent to the anchor instantiation time period.

20. The computer storage medium of claim 19, wherein the operations further comprise in response to detecting that the client device has moved outside of the authorized service location, preventing a network service data stream associated with the network service from being routed through the client device.

* * * * *